US008024560B1

(12) United States Patent
Alten

(10) Patent No.: US 8,024,560 B1
(45) Date of Patent: Sep. 20, 2011

(54) SYSTEMS AND METHODS FOR SECURING MULTIMEDIA TRANSMISSIONS OVER THE INTERNET

(76) Inventor: Alex I. Alten, Pleasanton, CA (US)

( * ) Notice: Subject to any disclaimer, the term of this patent is extended or adjusted under 35 U.S.C. 154(b) by 1023 days.

(21) Appl. No.: 11/248,133

(22) Filed: Oct. 12, 2005

Related U.S. Application Data

(60) Provisional application No. 60/617,981, filed on Oct. 12, 2004.

(51) Int. Cl.
*H04L 29/00* (2006.01)
(52) U.S. Cl. .................... 713/156; 713/193; 713/170
(58) Field of Classification Search ............... 713/193, 713/170, 156; 726/2; 380/243, 259; 235/379; 705/70.44, 76, 79, 71, 75
See application file for complete search history.

(56) References Cited

U.S. PATENT DOCUMENTS

| | | | | |
|---|---|---|---|---|
| 5,949,044 A | * | 9/1999 | Walker et al. | 235/379 |
| 2003/0033528 A1 | * | 2/2003 | Ozog et al. | 713/170 |
| 2003/0177379 A1 | * | 9/2003 | Hori et al. | 713/193 |

* cited by examiner

*Primary Examiner* — Vivek Srivastava
*Assistant Examiner* — Helai Salehi
(74) *Attorney, Agent, or Firm* — James M. Wu; JW Law Group

(57) ABSTRACT

In one embodiment, the systems and methods utilizes an enciphered permit identification number, called a session certificate, to reference the policy attribute values and session key that are stored in a secured, online reference monitor (SRM). The session key is used to encipher confidential communications, such as voice and audio communications over the Internet (VoIP), between computers. Each computer uses a unique key with a cryptographic transaction protocol for authentication and key agreement (PAKE) to securely communicate with the SRM. A sender computer uses PAKE to get a session certificate and a session key from the SRM. It sends the session certificate to a receiver computer. The receiver computer sends the session certificate to the SRM and gets back the session key. The sender computer encrypts its VoIP message with the session key and transmits it to the receiver computer. The receiver computer decrypts the VoIP message.

20 Claims, 20 Drawing Sheets

Entity Labels      1200

Sender Security Client = A
Receiver Security Client = B
Secure Reference Monitor = S

Data Structures      1202

Permit Identifier = PID
Nonce = $N_X$, where X is A, B or S
Time Stamp = $T_X$ where X is A, B or S
Message = $M_X$, where X is A, B, S or AB

Cryptographic Materials      1204

Session Key = $K_{AB}$
SRM Key = $K_S$
PAKE Key = $K_{XS}$, where X is A or B
Random Value = $R_X$, where X is A or B
Key Identifier or Key Index or Key Offset = $I_X$, where X is A, B or S

Key Derivation Algorithms      1206

One-Way Function = f()
Unilateral Authenticated Key = $K_X = f(I_X, R_X)$, where X is A or B
Mutally Authenticated Key = $K_{XS} = f(I_X, I_S, R_X)$, where X is A or B

Secure Message Types      1208

Encryption of message M with key K to provide confidentiality = (M)K
One-Way Transformation of message M with key K to provide integrity = [M]K
Encryption of message M with key K to provide confidentiality and integrity = {M}K

Certificate Types      1210

A and B Session Certificate = $SCert_{AB} = I_S, \{PID, T_S, N_S\}K_S$
PAKE Certificate = $PCert_S = I_S, \{K'_S, X, T_S, N_S\}K_S$, or $I_S, \{I'_S, X, T_S, N_S\}K_S$
where X = A or B.

Figure 12

Message Details

Example #1: Normal (insecure) F1 INVITE Alice -> Bob

2200
```
INVITE sip:bob@biloxi.example.com SIP/2.0
Via: SIP/2.0/TCP client.atlanta.example.com:5060;branch=z9hG4bK74bf9
Max-Forwards: 70
From: Alice <sip:alice@atlanta.example.com>;tag=9fxced76sl
To: Bob <sip:bob@biloxi.example.com>
Call-ID: 3848276298220188511@atlanta.example.com
CSeq: 1 INVITE
Contact: <sip:alice@client.atlanta.example.com;transport=tcp>
Content-Type: application/sdp
Content-Length: 151
```

2202
```
v=0
o=alice 2890844526 2890844526 IN IP4 client.atlanta.example.com
s=-
c=IN IP4 192.0.2.101
t=0 0
m=audio 49172 RTP/AVP 0
a=rtpmap:0 PCMU/8000
```

Figure 22

Message Details

Example #2: Secured F1 INVITE Alice -> Bob
2300                                                                Transport Mode

```
INVITE sip:bob@biloxi.example.com SIP/2.0
Via: SIP/2.0/TCP client.atlanta.example.com:5060;branch=z9hG4bK74bf9
Max-Forwards: 70
From: Alice <sip:alice@atlanta.example.com>;tag=9fxced76sl     2314
To: Bob <sip:bob@biloxi.example.com>
Call-ID: 3848276298220188511@atlanta.example.com
CSeq: 1 INVITE
Contact: <sip:alice@client.atlanta.example.com;transport=tcp>      2306
Security-Association: 23445908373654349845
Secure-Signature: 27340273658239201892747346392129723462012728962368467375 6
Content-Type: application/encrypted-text
Content-Length: 216                            2312        2310          2308
```

```
XdjfSD5FL8KJeFwil249873SJri6893dddhfgHJRTYDGdetRt5dgfHRtgAsgERTY65ghhjKL
H3456GSw245s3JOU77oL2QerY381934GfSxvBgfRTY56R3SjlMzAq345569JfghDFGFHNere
vSdfbne4568gBJJE23456BqW20GhSE87D6G5nMzxDsW02CbdgrQkHbMlRtyVb53A23fvbNMF
```
2302

Inside the encrypted text is:
2304

```
Content-Type: application/sdp      2316
Content-Length: 151
                                                                   2318
v=0
o=alice 2890844526 2890844526 IN IP4 client.atlanta.example.com
s=-
c=IN IP4 192.0.2.101
t=0 0
m=audio 49172 RTP/AVP 0
a=rtpmap:0 PCMU/8000
```

Figure 23

Example #3: Secured F1 INVITE Alice -> Bob          Tunnel Mode
2400
```
SECURE-REQUEST SSIP/1.0    ← 2406                    ← 2408
Security-Association: 73654349845234459083 ←
Secure-Signature: 2129723462012728962368467375627340273658239201892274734639
Content-Type: application/encrypted-text ←                    ← 2410
Content-Length: 360 ←                        2414    2412
```

```
9873SJri6893dddhfgHJRTYDGdetRt5dgfHRtgAsgERTY65ghhjKLXdjfSD5FL8KJeFwil24
QerY381934GfSxvBgfRTY56R3Sj1H3456GSw245s3JOU77oL2MzAq345569JfghDFGFHNere
bM1RtyVb53A23fvbNMFvSdfbne4568gBJJE23456BqW20GhSE87D6G5nMzxDsW02CbdgrQkH
gHJRTYDGdetRt5dgfHRtgAsgERTY65ghhjKLXdjfSD5FL8KJeFwil249873SJri6893dddhf
5569JfghDFGHNeL2QerY381934GfSxvBgfRTY56R3Sj1MzAq34reH3456GSw245s3JOU77o
```
2402

Inside the encrypted text is:

```
INVITE sip:bob@biloxi.example.com SIP/2.0
Via: SIP/2.0/TCP client.atlanta.example.com:5060;branch=z9hG4bK74bf9
Max-Forwards: 70
From: Alice <sip:alice@atlanta.example.com>;tag=9fxced76sl
To: Bob <sip:bob@biloxi.example.com>
Call-ID: 3848276298220188511@atlanta.example.com
CSeq: 1 INVITE
Contact: <sip:alice@client.atlanta.example.com;transport=tcp>
Content-Type: application/sdp
Content-Length: 151 v=0
o=alice 2890844526 2890844526 IN IP4 client.atlanta.example.com
s=-
c=IN IP4 192.0.2.101
t=0 0
m=audio 49172 RTP/AVP 0
a=rtpmap:0 PCMU/8000
```
2404

Figure 24

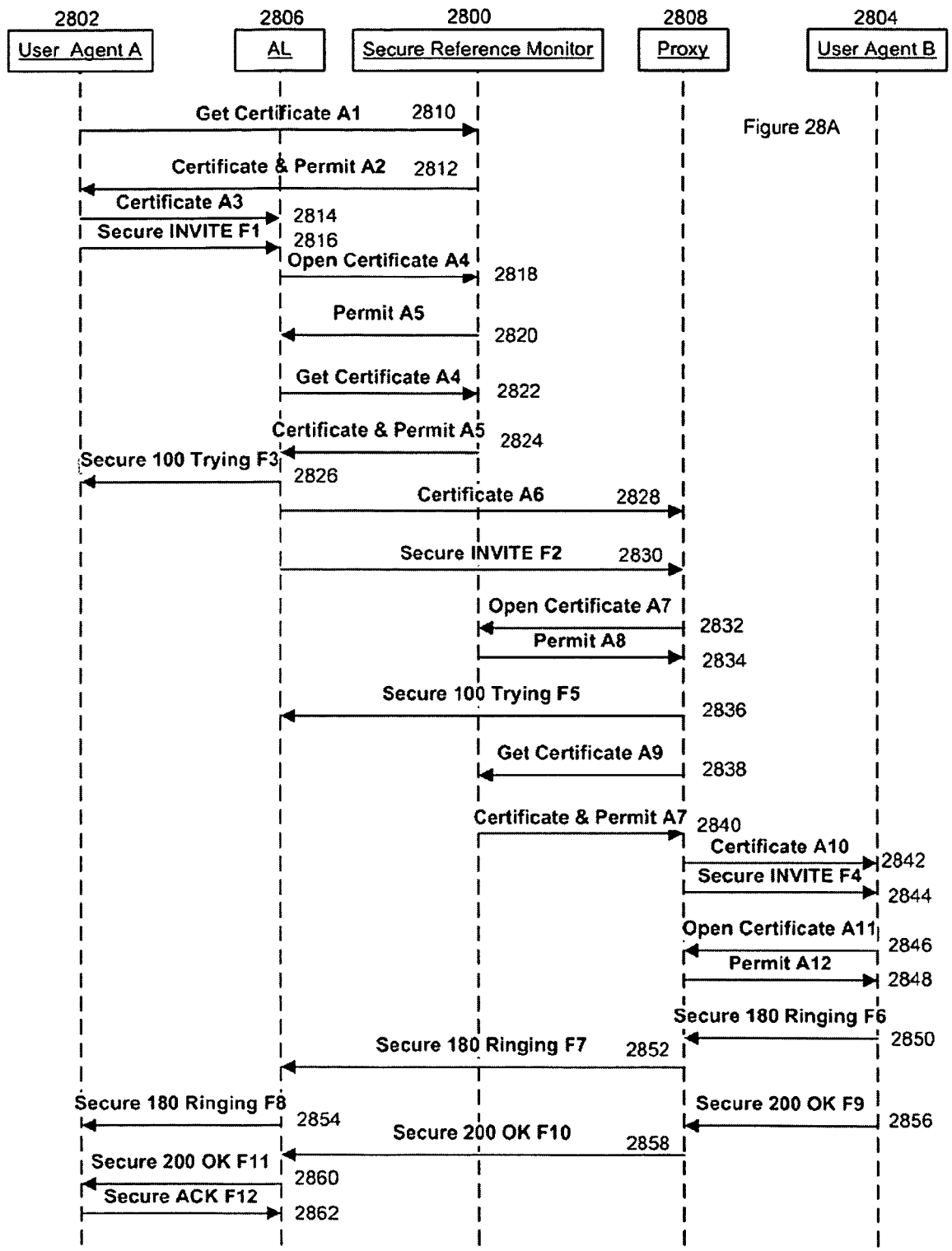

SYSTEMS AND METHODS FOR SECURING MULTIMEDIA TRANSMISSIONS OVER THE INTERNET

CROSS REFERENCE TO RELATED APPLICATIONS

The present application claims benefit of U.S. Provisional Patent Application No. 60/617,981 filed on Oct. 12, 2004, entitled "Systems and Methods for Securing Internet Session Initiation Protocol" listing the same inventor, the disclosure of which is hereby incorporated by reference.

FIELD OF THE INVENTION

This invention relates to securing multimedia transmissions in general and in particular to securing multimedia transmissions over the Internet.

BACKGROUND OF THE INVENTION

Most audio and video communications traditionally rely on the physical protection of the transmission medium to prevent eavesdropping, theft of services, and other types of malicious activities. With the advent of the Internet, such communications are now being routinely routed over Internet Protocol (IP) routing networks that cannot guarantee the physical protection of the packetized data of a multimedia communication. Cryptography can be employed to provide an equivalent set of protections for the communication transmissions.

In a general form, a networked security system is integrated with an insecure networked system, such as a VoIP system. The networked security system consists of physically secured reference monitors, with key management and policy adjudication components, and client computing devices running software applications that require security services, such as policy enforcement and encrypted data transmissions. The VoIP system consists of a networked autonomous system of computers and software applications (agents, servers, gateways) using Internet application layer protocols such as SIP, SDP, RTP and RTCP, running over UDP or TCP transport layer protocols that in turn use the IP routing layer protocol (either IP version 4 or IP version 6).

Additionally, VoIP imposes unique constraints on a security system, making it difficult to use standard Internet security technologies as-is. VPN technology, such as IPSec, prevents intermediate VoIP servers from inspecting in transit VoIP messages, cannot support multicast VoIP transmissions, and cannot meet FCC mandated wiretap regulations. PKI technology, such as X.509, cannot securely identify VoIP entities and it cannot support the real-time revocation of them. Standard public key exchange protocols, such as Diffie-Hellman based ones, cannot support wiretap requirements. And standard symmetric key authentication protocols, such as Kerberos, do not properly support mandatory access policy controls among all VoIP entities in the system.

SUMMARY OF THE INVENTION

In one embodiment, the systems and methods utilizes an enciphered permit identification number, called a session certificate, to reference the policy attribute values and session key that are stored in a secured, online reference monitor (SRM). The session key is used to encipher confidential communications, such as voice and audio communications over the Internet (VoIP), between computers. Each computer uses a unique key with a cryptographic transaction protocol for authentication and key agreement (PAKE) to securely communicate with the SRM. A sender computer uses PAKE to get a session certificate and a session key from the SRM. It sends the session certificate to a receiver computer. The receiver computer sends the session certificate to the SRM and gets back the session key. The sender computer encrypts its VoIP message with the session key and transmits it to the receiver computer. The receiver computer decrypts the VoIP message.

BRIEF DESCRIPTION OF THE DRAWINGS

FIG. 12 depicts a diagram illustrating the grammar and vocabulary of various cryptographic functions and data structures used by PAKE messages.

FIG. 22 depicts a diagram illustrating one embodiment of message formats between a User Agent and a Secure Reference Monitor.

FIG. 23 depicts a diagram illustrating one embodiment of a secured (transport mode) VoIP message.

FIG. 24 depicts a diagram illustrating one embodiment of a secured (tunnel mode) VoIP message.

FIGS. 28A and 28B depicts a time sequence diagram illustrating PAKE and secure VoIP message flows among User Agents, an Application Layer Gateway, a Proxy Server, and a Secure Reference Monitor.

DETAILED DESCRIPTION OF THE INVENTION

Specific reference is made in detail to the embodiments of the invention, examples of which are illustrated in the accompanying drawings and following descriptions. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

Figure 1:
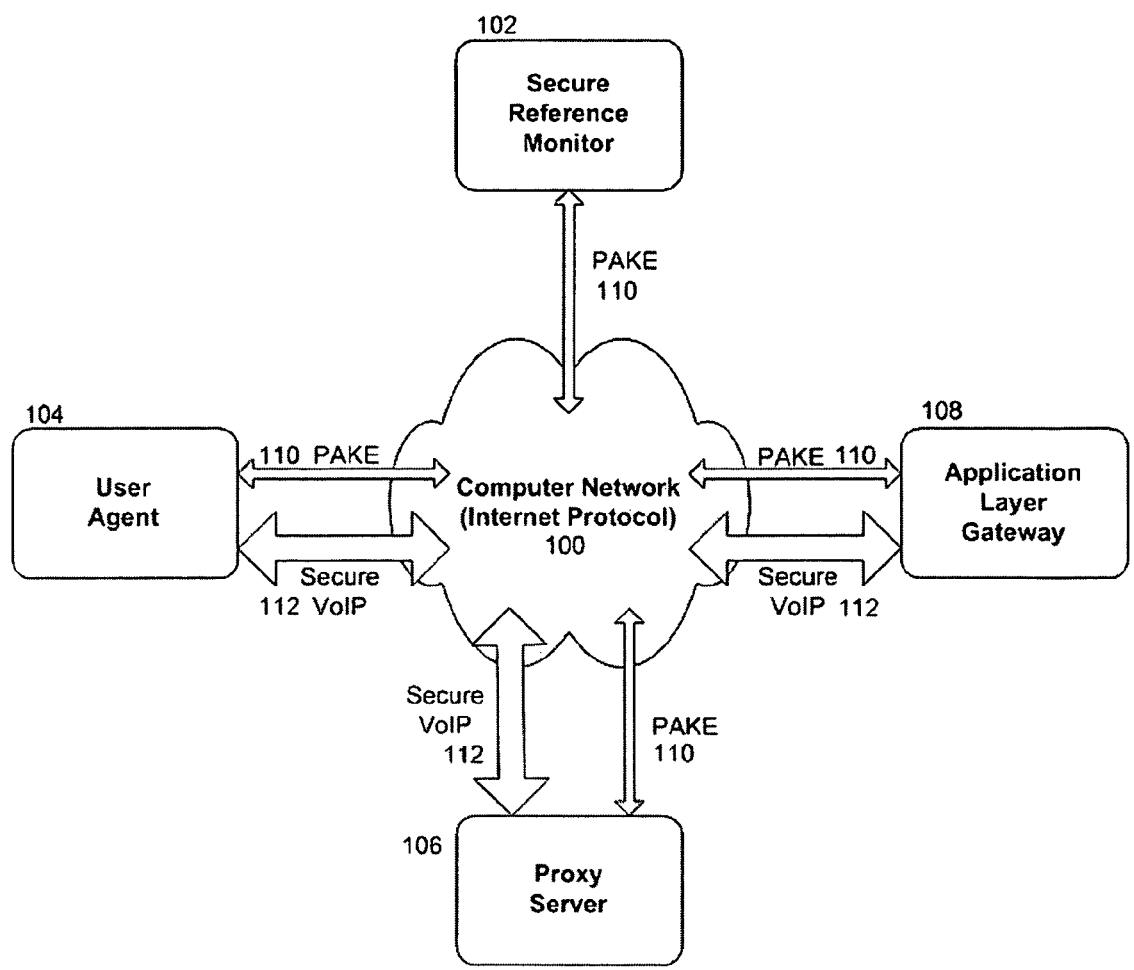
FIG. 1 depicts a diagram illustrating one embodiment of the types of devices that comprise a secure multimedia system interconnected via a computer network (such as an Internet).

Referring to FIG. 1, this illustrates the various types of computing devices that communicate with each other over a computer network using the Internet Protocol (100). All communications with the Secure Reference Monitor (SRM, 102) computing device are secured using cryptographic protocols for authentication and key exchange (PAKE, 110). Communications among the User Agent (104), Application Layer Gateway (ALG, 106)) and Proxy Server (108) computing devices are with secured VoIP protocols (112).

Figure 2:
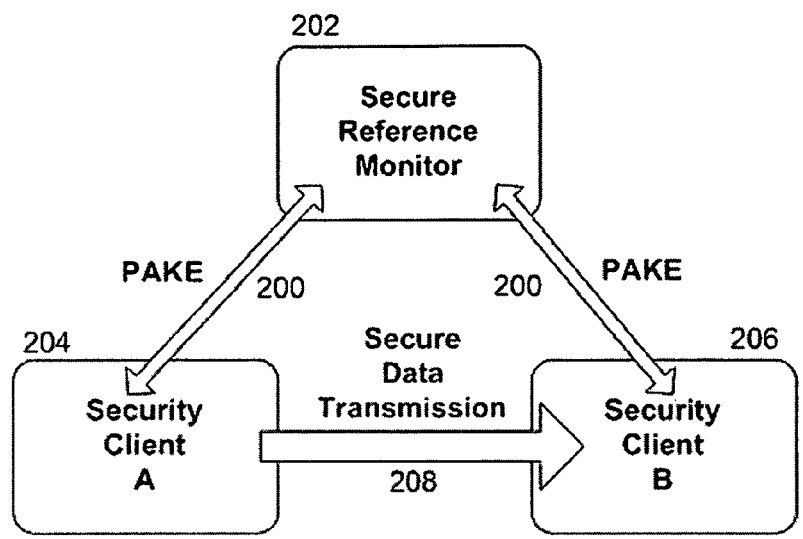
FIG. 2 depicts a diagram illustrating one embodiment of the communications between Security Clients and a Secure Reference Monitor.

Referring to FIG. 2, this illustrates the PAKE transactions (200) between an SRM (202) and two Security Clients, a sender A (204) and a receiver B (206), and a one-way flow of secured application messages (208) between the Security Clients.

The Security Client A (204) initiates a PAKE transaction with the SRM (202), then it sends the received Certificate to the Security Client B (206), followed by a series of secured messages (208) sent to Security Client B (206) using the received Session Key Material.

The Security Client B (206) when it receives the Certificate, initiates another PAKE transaction, with the Certificate in the request, and receives the Session Key Material, which it uses to decrypt the secured messages from Security Client A (204).

Figure 3:
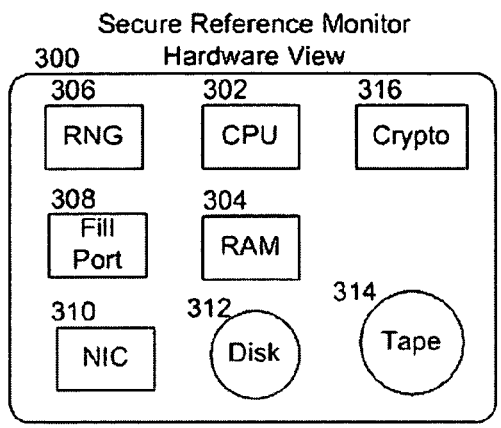
FIG. 3 depicts a diagram illustrating one embodiment of the hardware components inside of a Secure Reference Monitor computing device.

Referring to FIG. 3, this illustrates the various types of hardware components that are inside a SRM computing device (300). An SRM is a physically secure computing device such that it is protected from well-known Covert Channel and Trojan Horse attacks. There are Federal Government standards published by NIST, the DoD and other federal agencies, specifying how to secure a computing device from such types of malicious attacks. One embodiment is to operate the SRM at a System High security level inside of a physically secure room with a single public channel to an organization's computer network outside of the room. The SRM has one or more central processing units (CPU, 302). These can be multi-processor or multi-core CPUs. It has one or more volatile random access memory (RAM, 304) components. It may have a Random Number Generator (RNG, 306), typically using electron thermal noise to generate the random bits for keying materials. A Fill Port (308) may also be available to provide a trusted I/O channel to receive (or transmit) keying materials. It may have a cryptographic algorithm component (316) to provide acceleration of cryptographic computations or to provide physical security for those computations or keys via tamperproof or tamper resistant techniques. One or more Network Interface Cards (NIC, 310), such as Ethernet, are inside the SRM. A Hard Disk component (312), or other type of nonvolatile memory (such as Flash memory) stores the SRM's software and data. A high-speed tape component (314), or equivalent, is utilized for real-time audit data logging, and database and key material data recovery archival. And a Cryptographic hardware component (316), for accelerated or for more physically protected cryptographic computations, may be included as well.

Figure 4:
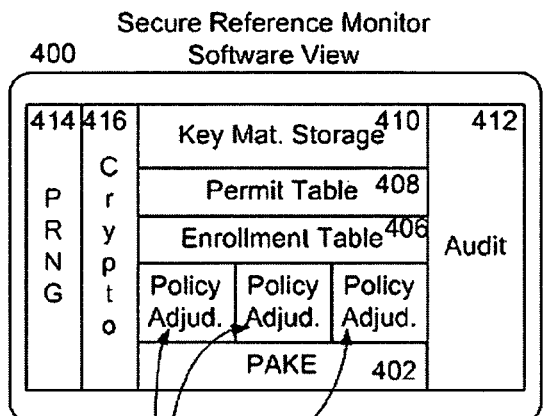
FIG. 4 depicts a diagram illustrating one embodiment of the software components inside of a Secure Reference Monitor computing device.

Referring to FIG. 4, this illustrates the various types of software components that are inside a SRM (400). The SRM (400) is an application that may run inside of a secure or ordinary operating system. It can be multi-threaded and multi-processing. One embodiment shown has a PAKE module (402) that provides the network enabled cryptographic protocol for authentication and key exchanges (PAKE) with other VoIP computing devices (know as Security Clients). There can be more than one PAKE module (402). There are one or more Policy Adjudication components (404), usually one per application type (for example: one for each type of User Agent, Proxy Server and ALG computing device). The Policy Adjudication components (404) accesses one or more user and computing device Enrollment Tables (406), one or more Permit Tables (408), and one or more Key Material Storage (410) components. Audit (412), Pseudo-Random Number Generator (PRNG, 414) and Cryptographic Algorithm (416) components are present as well. The Audit component provides an audit logging service, using archival tape (314), to all the other software components. For example a PAKE component may log received and sent PAKE transaction messages to the tape. The software PRNG (414) is seeded by random bits from the hardware RNG (306) or the Fill Port (308). Cryptographic software (416) components are provided to all other components, and may be replaced by equivalent hardware cryptographic (316) components.

An embodiment of a Permit Table (408) would be a simple array of rows of information in RAM or on disk, consisting of Session policy attribute values (valid time period, level, category, sender SID, receiver SID, group identification value, etc.) and a Session Key (1956). A Permit Identification (PID) would be an index value indicating which row to use when adjudicating policy (404). This PID is also placed inside of a Session Certificate (1952, see also 1210 definition of an "A to B Session Certificate"). Policy attribute values can be changed easily and immediately without having to modify all existing copies of the Session Certificate. Even the Session Key can be changed, although it could require the re-encryption of any data that was encrypted under the old Session Key.

If a wiretap is authorized under proper authority (e.g. a judicial warrant) then a Session Key associated with a PID inside of a Session Certificate can be given to an authorized Key Recovery Agent. The Key Recovery Agent would intercept a Session Certificate being transmitted between Security Clients. The Key Recovery Agent would then use PAKE or another secure channel to transmit the Session Certificate to the SRM and to receive the associated Session Key. The Key Recovery Agent could then use the Session Key to decrypt the encrypted communications between two or more Security Clients, i.e. to perform the wiretap.

An embodiment of an Enrollment Table (406) would be a simple array of rows of information in RAM or on disk, consisting of Security Client policy attribute values; a valid or revoked flag, a PAKE Authentication Key, valid time period, level, category, role, group membership, etc. When a Security Client is enrolled (by a SRM PSO) a row in the Enrollment Table is populated with policy attribute values, a PAKE Authentication Key is generated and stored in the row too. The row's index number then becomes the local component of a Security Identification number (SID), which consist of two components, a globally unique identifier number assigned to the SRM and the index value number. Another Security Client never reuses the SID during the operational lifetime of the SRM.

When a Security Client must be revoked an Enrollment Agent can mark the Enrollment Table row, which is indexed by the local component of it's SID, by setting the row's flag field to indicate a revocation. This row can never be reused, so that archived audit records of past security events (i.e. audited PAKE transactions with SID values) can remain useful for future reports and forensic investigations into security breaches. Revocation is immediately effective (i.e. real-time revocation), all future PAKE requests by the Security Client with this revoked SID will fail.

Figure 5:
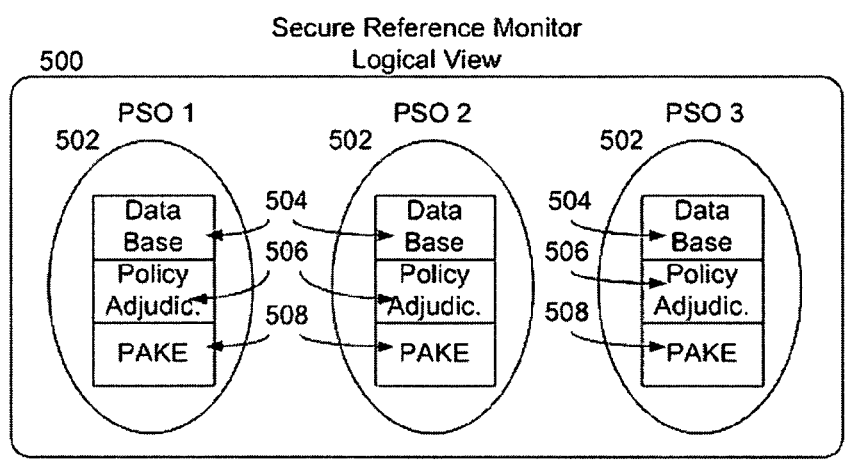
FIG. 5 depicts a diagram illustrating one embodiment of the logical components inside of a Secure Reference Monitor computing device.

Referring to FIG. 5, this illustrates the various logical components that comprise the SRM (500). Inside an SRM (500) are one or more Partitioned Security Objects (PSO, 502). Each PSO (502) contains a Database (504) component for storing PAKE and Session Key Materials, issued Permits and current LSO enrollment information, a Policy Adjudication (506) component, and a PAKE (508) component. PSO's can share Database and PAKE components with each other, with one embodiment being an object oriented inheritance from common Database and PAKE components. A PSO's Policy Adjudication component can use object-oriented polymorphism to inherit policy rules and attributes from a common PSO Policy Adjudication component, but it contains policy rules and attributes changes specific to supporting its respective Security Client LSO Policy Enforcement component.

When a PSO receives a PAKE request message from an LSO from the public network channel, it first enters the PAKE component. The PAKE component uses the cleartext SID in the PAKE request message to quickly get PAKE Key Materials from the Database component in order to validate the PAKE request message's Signature and, if necessary, to decrypt it's ciphertext. It also can write some or all of the cleartext PAKE message to a real-time tape storage component. Using the Information from the message it then performs the requested operation, such as getting a new Certificate, that involves reading or writing data to the Database component and execution of the Policy adjudication logic. Once complete a PAKE response message is formed, encrypted and signed with the LSO PAKE Key Material, written to the audit tape, and sent back to the requesting Security Client LSO over the public network channel.

Figure 6:
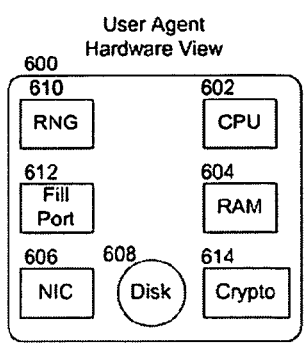
FIG. 6 depicts a diagram illustrating one embodiment of the hardware components inside of a User Agent computing device.

Referring to FIG. 6, this illustrates the various hardware components inside a User Agent (600) computing device. Similar to an SRM, it too contains a CPU (602), RAM (604), MC (606) and disk (608) and may contain an RNG (610) or a Fill Port (612).

Figure 7:
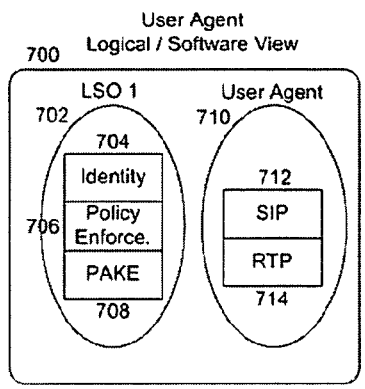
FIG. 7 depicts a diagram illustrating one embodiment of the software components inside of a User Agent computing device.

Referring to FIG. 7, this illustrates the various logical components inside a User Agent computing device (700). It contains a software Identity component (704) that securely receives from the user, via a Secure Path (1210 or 1212), PAKE Key Materials (1230 or 1232) to authenticate a user, the computing device or software application to the SRM. In one embodiment, a key derived from a user's password may encrypt the PAKE Key Materials. It contains a Policy Enforcement component (706) that implements mandatory and discretionary access control and data-at-rest (DAR) or data-in-transit (DIT) encryption. Policy Enforcement contains cryptographic software or uses a Cryptographic hardware component (614). It contains a PAKE component (708) that is the counter party to the SRM's PAKE component. The PAKE component may use PRNG software or a RNG hardware component (610). The PRNG may get its random seed from the RNG (610) or the Fill Port (612). Together these three components are referred to as the Local Security Object (LSO, 702). The User Agent application (710) consists of SIP (712) and RTP/RTCP (714) software components and it uses the LSO components to secure SIP, RTP and RTCP messages. Other types of messages, such as H.323, could be secured as well with additional similar components.

When the SIP Application wishes to encrypt SIP messages with Session Key Material (1956) then it requests it from the LSO. The LSO's PAKE component forms a PAKE request message, encrypted and signed with the LSO PAKE Key Material (1930) and sends it to the appropriate SRM PSO over the public network channel. When it gets the PAKE response message back, the LSO's PAKE component validates it, decrypts it's ciphertext to get the Session Certificate (1952) and Session Key Material (1956). It hands them both to the SIP Application.

When the SIP Application decrypts SIP messages with Session Key Material (1956), it requests it from the LSO and hands over a Session Certificate (1952). The LSO PAKE component forms a PAKE request message containing the Session Certificate, encrypted and signed with the LSO PAKE Key Material (1928) and sends it to the appropriate SRM PSO over the public network channel. When it gets the PAKE response message back, the LSO's PAKE component validates it, decrypts it's ciphertext to get the Session Key Material. It hands the Session Key Material to the SIP Application.

Figure 8:
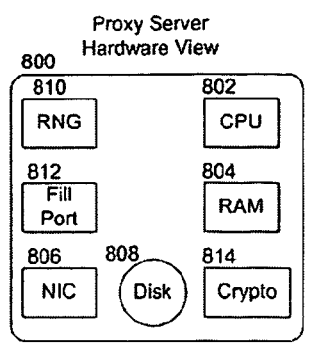
FIG. 8 depicts a diagram illustrating one embodiment of the hardware components inside of a Proxy Server computing device.

Referring to FIG. 8, this illustrates the various hardware components inside a Proxy Server (800) computing device.

Similar to an SRM, it contains a CPU (802), RAM (804), NIC (806) and disk (808) and may contain an RNG (810) or Fill Port (812).

Figure 9:
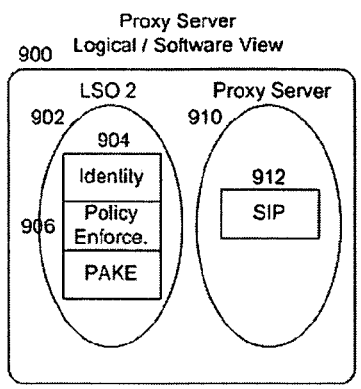
FIG. 9 depicts a diagram illustrating one embodiment of the software components inside of a Proxy Server computing device.

Referring to FIG. 9, this illustrates the various logical components inside a Proxy Server computing device (900). Similar to a User Agent, it too contains a LSO (902) with Identity (904), Policy Enforcement (906) and PAKE (908) components. Its Proxy Server application (910) includes a SIP component (912).

Figure 10:
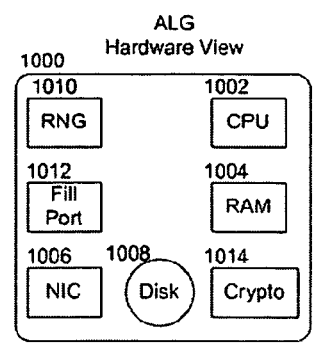
FIG. 10 depicts a diagram illustrating one embodiment of the hardware components inside of an Application Layer Gateway (ALG) computing device.

Referring to FIG. 10, this illustrates the various hardware components inside an ALG (1000) computing device. Similar to an SRM, it contains a CPU (1002), RAM (1004), NIC (1006) and disk (1008) and may contain an RNG (1010) or Fill Port (1012).

Figure 11:
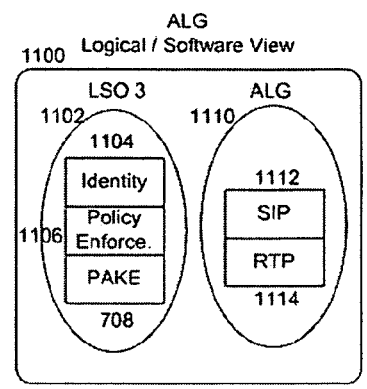
FIG. 11 depicts a diagram illustrating one embodiment of the software components inside of an ALG computing device.

Referring to FIG. 11, this illustrates the various logical components inside an ALG computing device (1100). Similar to a User Agent, it contains a LSO (1102) with Identity (1104), Policy Enforcement (1106) and PAKE (1108) components. It's ALG application (1110) consists of SIP (1112) and RTP/RTCP (1114) components.

Referring to FIG. 12, this illustrates an embodiment of the grammar and vocabulary of cryptographic data and algorithms used in the PAKE transaction protocol. The Entity Labels (1200) represent the identifier numbers or strings used to represent a Security Client A, a Security Client B or an SRM. They are also used as subscripts to indicate which entity created a data structure, cryptographic material, certificate type or used an algorithm. The non-cryptographic Data Structures (1202) are a Permit Identification number that is used to identify which entry in the Permit table is involved, a Nonce that is a number that is unique each time it is created, a Time Stamp number or string, and a Message. The Cryptographic Materials (1204) are a Session Key used to encrypt data transmitted from Security Client A to Security Client B, a Key that is generated by the SRM, and a PAKE Key that is generated from a Key Index (ID or Offset) that operates with a Random Value. The Key Derivation Algorithms (1206) are a One-Way Function, a Key that is Unilaterally Authenticated by an Index generated by a Security Client only, and a Key that is Mutually Authenticated by two Indices, one generated by a Security Client and the other by a SRM. The Secure Message Types are an Encrypted Message with a Key, a Keyed One-Way Hash Value of a Message, and a Message and its One-Way Hash Value that are Encrypted with a Key. There are two Certificate Types (1210), a Session Certificate containing an encrypted Permit Identifier (and the attached, encrypted Hash Value of the encrypted Permit Identifier) using a Key that is derived from a Key Index value that is attached and is not encrypted, and a PAKE Certificate containing either an encrypted Key or encrypted Key Index value (and the attached, encrypted Hash Value of either the encrypted Key or encrypted Key Index) using a Key that is privately known only to the SRM. All Keys could be used with either Symmetric or Public Key based cryptographic algorithms. Note that the Permit Identifier in the Session Certificate is used to locate a Permit entry in a Permit Table that contains all the information necessary about the communicating parties.

Figure 13:
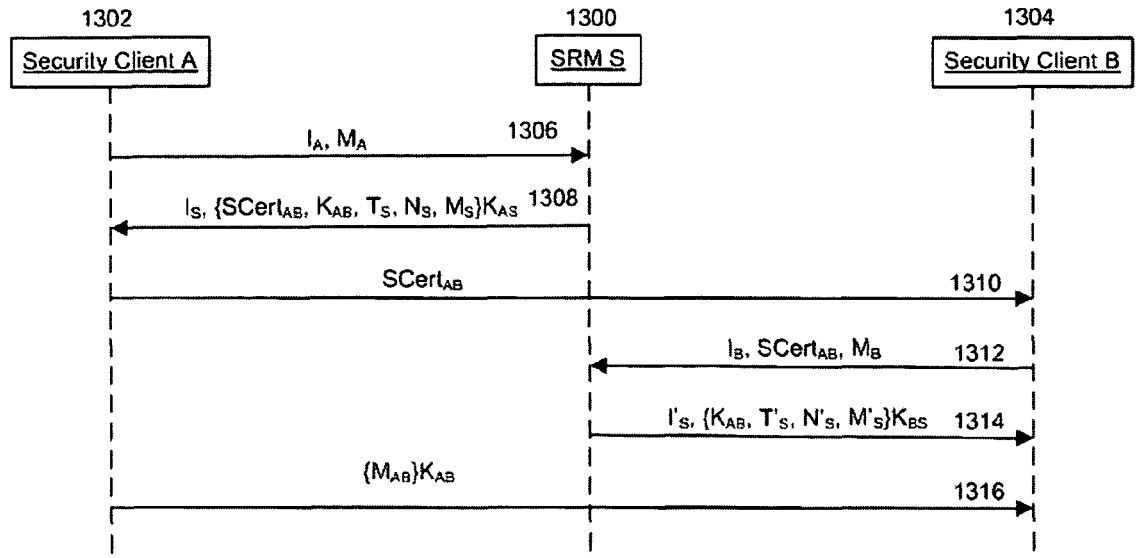
FIG. 13 depicts a sequence illustrating one embodiment of the PAKE protocol between User Agents and a Secure Reference Monitor.

Referring to FIG. 13, this illustrates an embodiment of the sequence of PAKE messages between the Security Clients and the SRM. PAKE messages are usually small, fitting into a UDP packet over an Ethernet MTU. They can also be transmitted over TCP, especially if a message payload is larger than an Ethernet MTU. Their format can be in binary form or be in human readable encodings such as SMTP, MIME, HTML, SDP or XML. An embodiment of Security Clients is VoIP User Agents, Proxy Servers, and ALGs.

The Security Client A (1302) initiates a two-pass PAKE transaction with SRM S (1300). It sends the PAKE request message (1306) containing the cleartext with a random key selection Index value, $I_A$, and a message $M_A$. The $M_A$ contains information for a request for a new Certificate, $SCert_{AB}$, and a Session Key, $K_{AB}$, to enable the encrypting of messages from the sender, Security Client A (1302), to the receiver, Security Client B (1304).

The SRM S sends a PAKE response message (1308) to Security Client A, with a cleartext random key selection Index value, $I_S$, and a cipher text encrypted with a key, $K_{AS}$, providing confidentiality and integrity. The preferred method is to derive the key $K_{AS}$ by using $I_A$ and $I_S$ to select it from a larger random secret value, $R_A$. SRM S gave $R_A$ a priori in a secure manner to Security Client A during an earlier enrollment process. $I_A$ and $I_S$ could each be one or more random key indices. $R_A$ could be partitioned into regions, $I_A$ and $I_S$ could be used to select key material from each region that is then combined together, one embodiment is an exclusive OR (XOR) operation, to manufacture $K_{AS}$. Another embodiment would be that $R_A$ could be an array of keys where both $I_A$ and $I_S$ are added together and the resulting number is used as an index to select a $K_{AS}$ from the array. Another embodiment would be that $R_A$ could be a set of shared Diffie-Hellman discrete logarithm algorithm parameters where $I_A$ and $I_S$ are random secret values used to create a shared secret $K_{AS}$.

Inside the ciphertext of the PAKE response would be the new Certificate, $SCert_{AB}$, the new Session Key $K_{AB}$, and Timestamp $T_S$, Nonce $N_S$ and Message $M_S$. An embodiment of $M_S$ is to contain DAC information that can be used at Security Client A's discretion, for example personal firewall configuration information or the current destination IP address of Security Client B. The optional $T_S$ and $N_S$ can be used to strengthen the PAKE by mitigating Man-In-The-Middle (MITM), replay and reflection Denial-Of-Service (DOS) attacks.

The Security Client A receives the PAKE response from the SRM S, decrypts the ciphertext using $K_{AS}$, and extracts the $SCert_{AB}$ and $K_{AB}$. The preferred method is to derive the key $K_{AS}$ is by using $I_A$ and $I_S$ to select it from a larger random secret value, $R_A$. SRM S gave $R_A$ a priori in a secure manner to Security Client A during an earlier enrollment process.

Security Client A sends the $SCert_{AB}$ to the Security Client B, which receives it (1310).

The Security Client B initiates a two-pass PAKE transaction with SRM S. It sends the PAKE request message (1312) containing the cleartext with a random key selection Index value, $I_B$, the $SCert_{AB}$, and a message $M_B$. The $M_B$ contains information for a request for a Session Key, $K_{AB}$, to enable the decrypting of messages from the sender, Security Client A, to the receiver, Security Client B.

The SRM S sends a PAKE response message (1314) to the Security Client B, with a cleartext random key selection Index Value, $I'_S$, and a cipher text encrypted with a mutually authenticated key, $K_{BS}$, providing confidentiality and integrity. The preferred method is to derive the key $K_{BS}$ by using $I_B$ and $I'_S$ by to select it from a larger random secret value, $R_B$. SRM S gave $R_B$ a priori in a secure manner to Security Client B during an earlier enrollment process.

Inside the ciphertext of the PAKE response would be the new Session Key $K_{AB}$, and Timestamp $T'_S$, Nonce $N'_S$ and Message $M'_S$. An embodiment of $M'_S$ is to contain DAC information that can be used at Security Client B's discretion. The optional $T'_S$ and $N'_S$ are used to mitigate attacks.

The Security Client B receives the PAKE response from the SRM S, decrypts the ciphertext using $K_{BS}$, and extracts the $K_{AB}$. The preferred method is to derive the key $K_{BS}$ by using $I_B$ and $I_S$ to select it from a larger random secret value, $R_B$. SRM S gave $R_B$ a priori in a secure manner to Security Client B during an earlier enrollment process.

Security Client A sends a cipher text, containing $M_{AB}$, which is encrypted with the Session Key $K_{AB}$, providing confidentiality and integrity, to Security Client B (1316).

Figure 14:
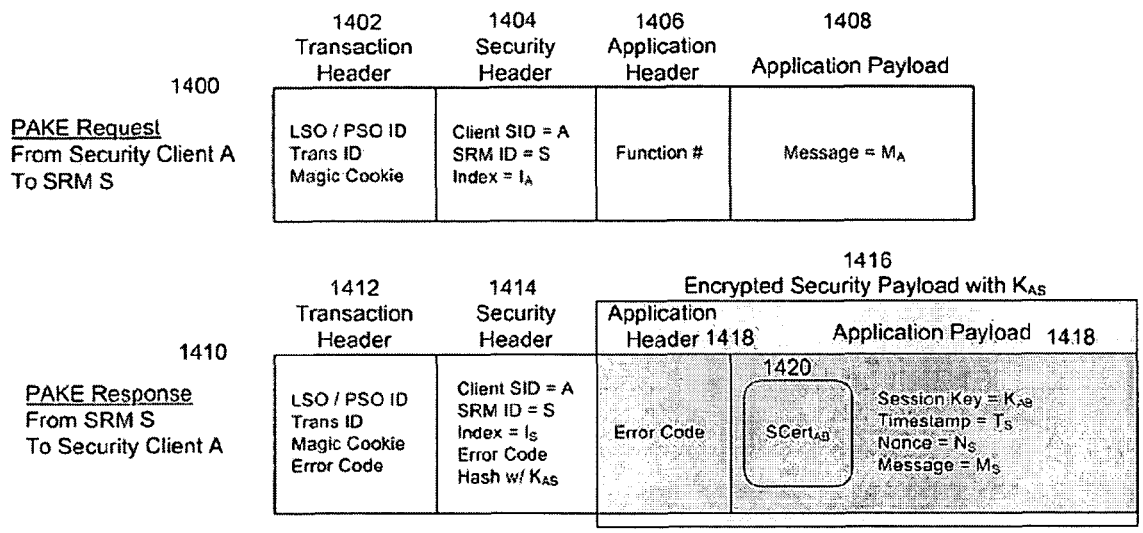
FIG. 14 depicts a diagram illustrating one embodiment of the PAKE request and response message formats between a User Agent A and a Secure Reference Monitor.

Referring to FIG. 14, this illustrates an embodiment of the data structure of the 2-pass PAKE transaction messages between Security Client A and SRM S.

Security Client A sends a PAKE Request message (1400) to SRM S. Its data structure consists of a Transaction Header (1402), a Security Header (1404), an Application Header (1406) and an Application Payload (1408). Each header typically has a version number and the length of the data payload following it that may include other headers. If the following payload is encrypted then there may be two lengths, one for the cleartext and the other for the ciphertext lengths of the following data payload.

There may be one or more key indices created by Security Client A and also by the SRM S used to derive one or more cryptographic keys and to mutually authenticate the PAKE response messages. These indices are added together, the preferred way is ones complement addition also known as exclusive OR (XOR) addition, and then are used to extract one or more keys (and IV's) from an a priori large random secret shared between A and S during an enrollment phase earlier. The combined indices could be used as an offset into an array of secret keys, or they could be used to extract strips of key material that are then combined, either by using an XOR operation or by shuffling, to create one or more keys (and IV's). These keys are used to encrypt or decrypt the ciphertext portion of the PAKE message and the one-way hash value of the ciphertext.

The Transaction Header contains a LSO/PSO identification number, a transaction identifier (used to match responses to queued requests), and a Magic Cookie value (used by software above this layer in the stack).

The Security Header contains the Security Client A's Security Identifier (SID), the SRM Identifier, and one or more random PAKE key indices to be used in selecting one or more PAKE keys that are to be used to encrypt a response.

The Application Header contains a function number (to get a Certificate.

The Application Payload may contain message data useful to the receiving PSO.

SRM S sends a PAKE Response message (1410) to Security Client A. It's data structure consists of a Transaction Header (1412), a Security Header (1414), and an Encrypted Security Payload (1416) that is encrypted with one or more keys selected by using key indices $I_A$, from the Security Client A, and $I_S$, from the SRM S. Inside the Encrypted Security Payload are the Application Header (1418) and the Application Payload (1420).

The Transaction Header contains the LSO/PSO identification number, a transaction identifier, a magic cookie value (copied from the request), and an error code (if necessary).

The Security Header contains the Security Client A's Security Identifier (SID), the SRM Identifier, one or more random PAKE key indices to be used in selecting one or more PAKE keys, an error code (if necessary), and a one-way hash, which is encrypted with the PAKE keys, of the Security Header and Encrypted Security Payload portions of the message.

The Encrypted Security Payload is encrypted with the PAKE keys.

The Application Header contains an error code (if necessary).

The Application Payload contains a Session Certificate (1422, 1510) and one or more Session Keys to allow Security Client's A and B to communicate securely. It also may have a Timestamp and Nonce to defeat certain types of attacks, and any message data useful to the receiving LSO.

Figure 15:
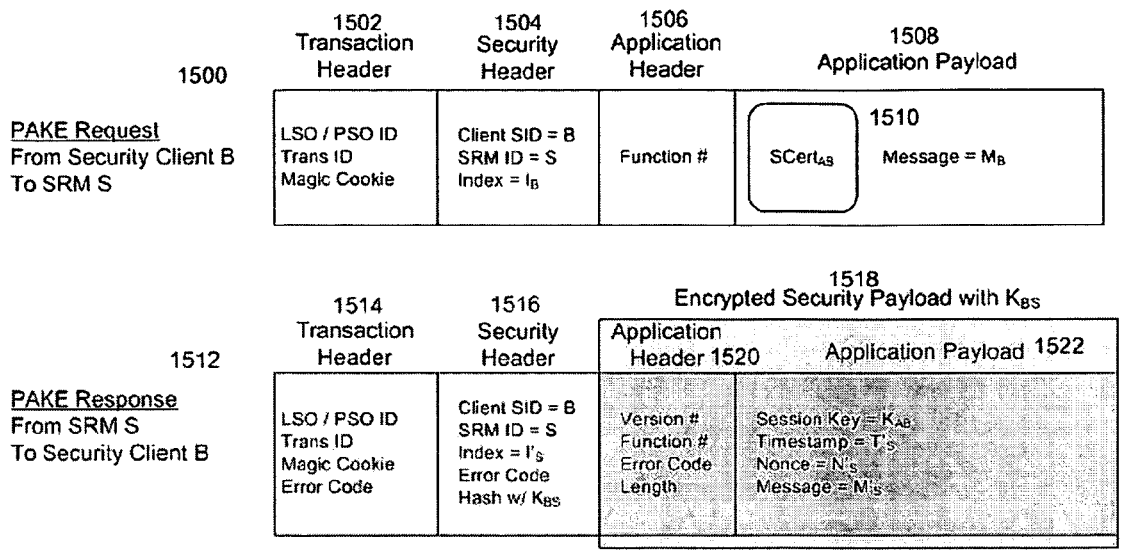
FIG. 15 depicts a diagram illustrating one embodiment of the PAKE request and response message formats between a User Agent B and a Secure Reference Monitor.

Referring to FIG. 15, this illustrates an embodiment of the data structure of the 2-pass PAKE transaction messages between Security Client B and SRM S.

Security Client B sends a PAKE Request message (1500) to SRM S. Its data structure consists of a Transaction Header (1502), a Security Header (1504), an Application Header (1506) and an Application Payload (1508).

The Transaction Header contains a LSO/PSO identification number, a transaction identifier, and a magic cookie value.

The Security Header contains the Security Client B's Security Identifier (SID), the SRM Identifier, and one or more random PAKE key indices to be used in selecting one or more PAKE keys to be used to encrypt a response.

The Application Header contains a function number (to open a Certificate).

The Application Payload contains a Session Certificate (1510, 1422) and may contain message data useful to the receiving PSO.

SRM S sends a PAKE Response message (1512) to Security Client B. It's data structure consists of a Transaction Header (1514), a Security Header (1516), and an Encrypted Security Payload (1518) that is encrypted with one or more keys selected by using Key Indices $I_B$ from the Security Client A and $I_S$ from the SRM S. Inside the Encrypted Security Payload are the Application Header (1520) and the Application Payload (1522).

The Transaction Header contains the LSO/PSO identification number, a transaction identifier, a magic cookie value, and an error code.

The Security Header contains the Security Client B's Security Identifier (SID), the SRM Identifier, one or more random PAKE Indices to be used in selecting one or more PAKE keys, an error code, and a one-way hash, which is encrypted with the PAKE keys, of the Security Header and the Encrypted Security Payload.

The Application Header contains an error code.

The Application Payload contains one or more Session Keys to allow Security Client's A and B to communicate securely. It also may have a Timestamp and Nonce to defeat certain types of attacks, and any message data useful to the receiving LSO.

Figure 16:
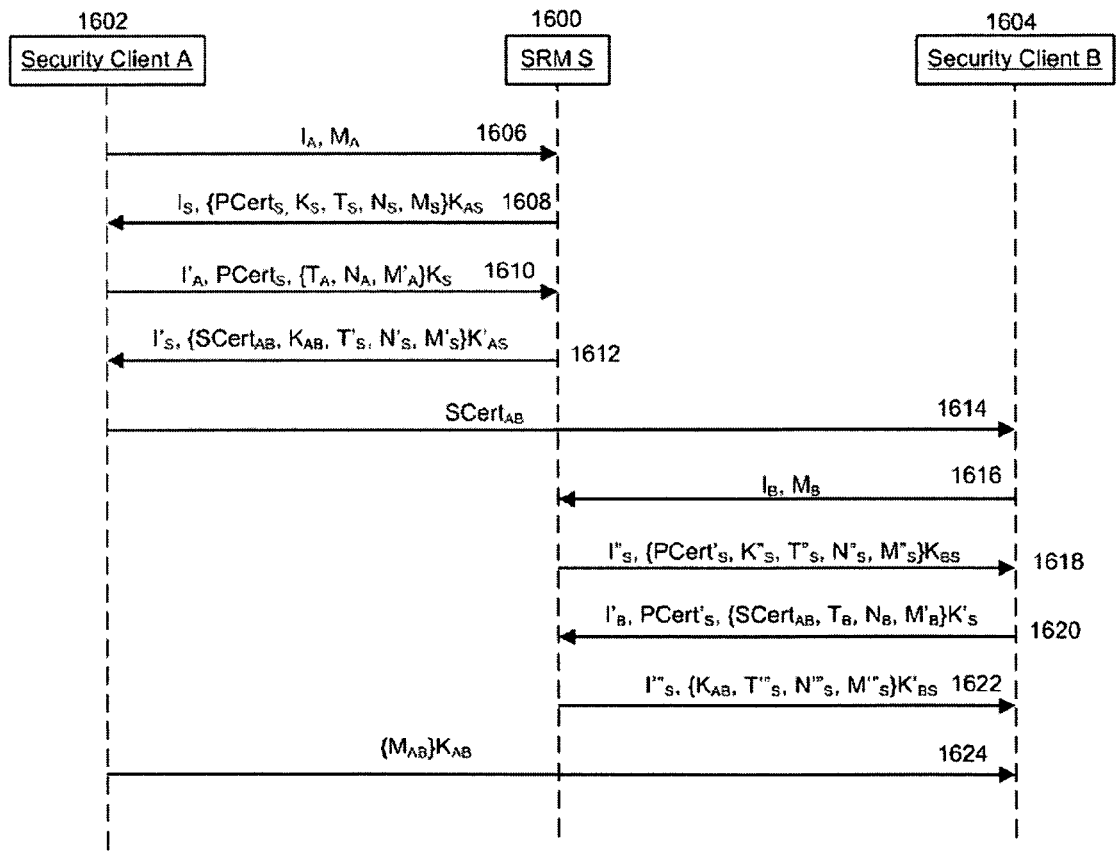
FIG. 16 depicts a sequence illustrating one embodiment of the PAKE protocol between User Agents and a Secure Reference Monitor.

Referring to FIG. 16, this illustrates another embodiment of the sequence of PAKE messages between the Security Clients and the SRM that provides privacy and integrity of a PAKE request message.

The Security Client A (1602) initiates a four-pass PAKE transaction with SRM S (1600). The first two messages are used to set up the privacy and integrity of the $2^{nd}$ PAKE request message. It sends the $1^{st}$ PAKE request message (1606) containing cleartext with a random key selection Index value, $I_A$, and a message $M_A$. The $M_A$ contains information for a request for a Transaction Key, $K_S$, to enable the encrypting of the $2^{nd}$ PAKE request message from Security Client A to SRM S.

The SRM S sends a $1^{st}$ PAKE response message (1608) to the Security Client A, with a cleartext random key selection Index value, $I_S$, and a cipher text encrypted with a mutually authenticated key, $K_{AS}$, providing confidentiality and integrity. The preferred method is to determine $K_{AS}$ using $I_A$ and $I_S$ to select it from an a priori shared secret $R_A$.

Inside the ciphertext of the 1$^{st}$ PAKE response would be a 1$^{st}$ PAKE Certificate, PCert$_S$, a PAKE Key generated randomly by SRM S, K$_S$, and Timestamp T$_S$, Nonce N$_S$ and Message M$_S$.

Security Client A sends a 2$^{nd}$ PAKE request message (1610) containing cleartext with a random key selection Index value, I'$_A$, the PCert$_S$, and a cipher text encrypted with PAKE Key K$_S$ providing confidentiality and integrity.

Inside the ciphertext of the 2$^{nd}$ PAKE request would be Timestamp T$_A$, Nonce N$_A$ and Message M'$_A$. The M'$_A$ contains information for a request for a new Session Certificate, SCert$_{AB}$, and a Session Key K$_{AB}$, to enable the encrypting of messages from the sender, Security Client A, to the receiver, Security Client B.

The SRM S sends a 2$^{nd}$ PAKE response message (1612) to the Security Client A, with a cleartext random key selection Index value, I'$_S$, and a cipher text encrypted with a mutually authenticated key, K'$_{AS}$, providing confidentiality and integrity. The preferred method is to determine K'$_{AS}$ using I'$_A$ and I'$_S$ to select it from the a priori shared secret R$_A$.

Inside the ciphertext of the 2$^{nd}$ PAKE response would be the new Session Certificate, SCert$_{AB}$, the new Session Key K$_{AB}$, and Timestamp T'$_S$, Nonce N'$_S$ and Message M'$_S$.

The Security Client A receives the 2$^{nd}$ PAKE response from the SRM S, decrypts the ciphertext using K$_{AS}$, and extracts the SCert$_{AB}$ and K$_{AB}$. The preferred method is to determine K$_{AS}$ by using I$_A$ and I$_S$ with the a priori shared secret R$_A$.

Security Client A sends the SCert$_{AB}$ to the Security Client B, which receives it (1614).

The Security Client B (1604) initiates a four-pass PAKE transaction with SRM S (1600). The first two passes are used to set up the privacy and integrity of the 2$^{nd}$ PAKE request message. It sends the 1$^{st}$ PAKE request message (1616) containing cleartext with a random key selection Index value, I$_B$, and a message M$_B$. The M$_B$ contains information for a request for a Transaction Key, K'$_S$, to enable the encrypting of the 2$^{nd}$ PAKE request message from Security Client B to SRM S.

The SRM S sends a 1$^{st}$ PAKE response message (1618) to the Security Client B, with a cleartext random key selection Index value, I"$_S$, and a cipher text encrypted with a mutually authenticated key, K$_{BS}$, providing confidentiality and integrity. The preferred method is to determine K$_{BS}$ by using I$_B$ and I"$_S$ with the a priori shared secret R$_B$.

Inside the ciphertext of the 1$^{st}$ PAKE response would be a 2$^{nd}$ PAKE Certificate, PCert'$_S$, another PAKE Key generated randomly by SRM S, K'$_S$, and Timestamp T"$_S$, Nonce N"$_S$ and Message M"$_S$.

Security Client B sends the 2$^{nd}$ PAKE request message (1620) containing cleartext with a random key selection Index value, I'$_B$, the PCert'$_S$, and a cipher text encrypted with PAKE Key K'$_S$ providing confidentiality and integrity.

Inside the ciphertext of the 2$^{nd}$ PAKE request would be the Session Certificate, SCert$_{AB}$, Timestamp T$_B$, Nonce N$_B$ and Message M'$_B$. The M'$_B$ contains information for a request for a Session Key K$_{AB}$, to enable the decrypting of messages from the sender, Security Client A, to the receiver, Security Client B.

The SRM S sends a 2$^{nd}$ PAKE response message (1622) to the Security Client B, with a cleartext random key selection Index value, I'''$_S$, and a cipher text encrypted with a mutually authenticated key, K'$_{BS}$, providing confidentiality and integrity. The preferred method is to determine K'$_{BS}$ using I'$_B$ and I'$_S$ to select it from the a priori shared secret R$_B$.

Inside the ciphertext of the 2$^{nd}$ PAKE response would be the Session Key K$_{AB}$, and Timestamp T'''$_S$, Nonce'''$_S$ and Message M'''$_S$.

The Security Client B receives the 2$^{nd}$ PAKE response from the SRM S, decrypts the ciphertext using K'$_{BS}$ and extracts the K$_{AB}$. The preferred method is to determine K'$_{BS}$ by using I'$_B$ and I'$_S$ with the a priori shared secret R$_B$.

Security Client A sends a cipher text, containing M$_{AB}$, which is encrypted with the Session Key K$_{AB}$, providing confidentiality and integrity, to Security Client B (1624).

Figure 17:
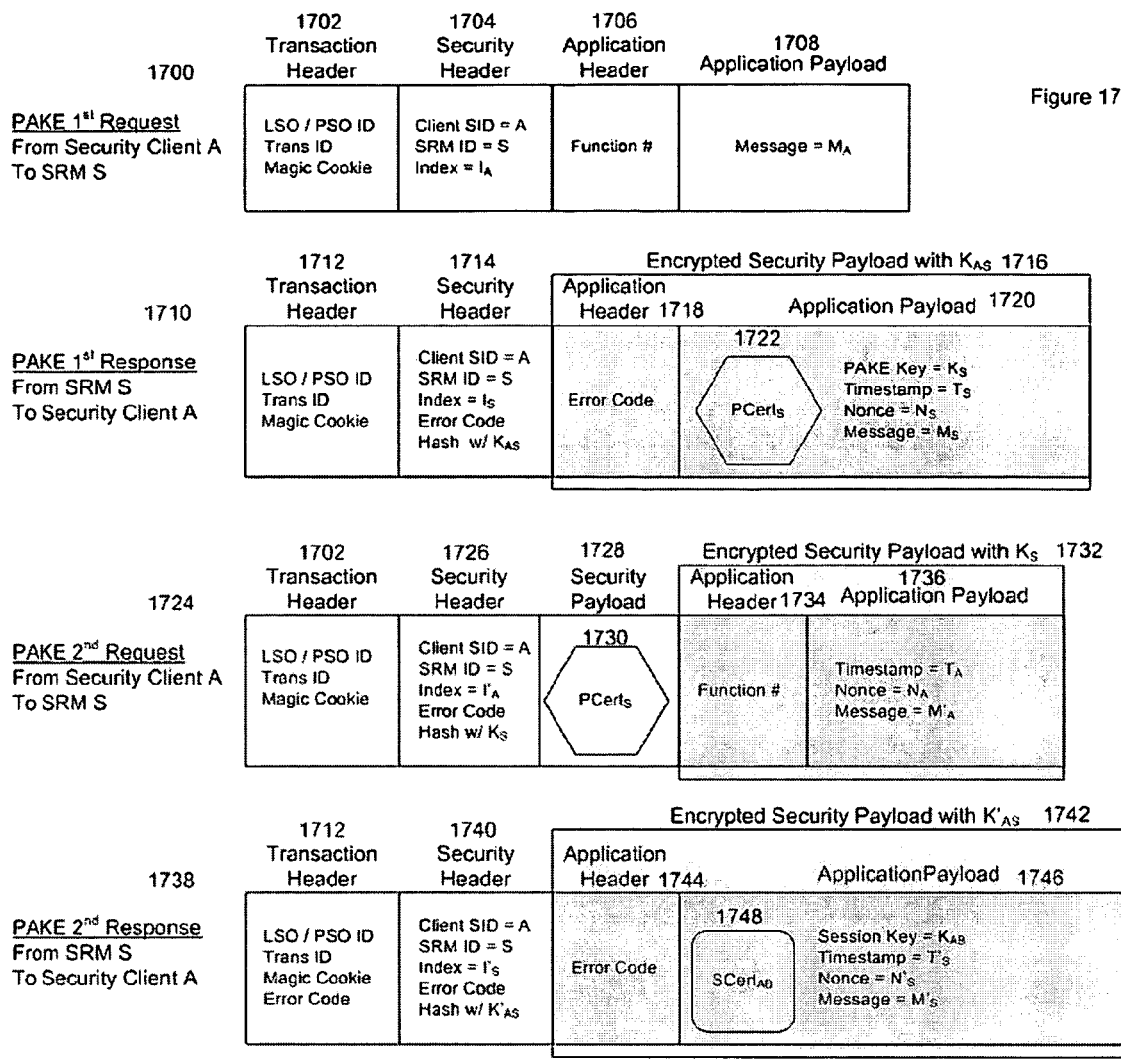
FIG. 17 depicts a diagram illustrating one embodiment of the PAKE request and response message formats between a User Agent A and a Secure Reference Monitor.

Referring to FIG. 17, this illustrates an embodiment of the data structure of the 4-pass PAKE transaction messages between Security Client A and SRM S.

Security Client A sends a 1$^{st}$ PAKE Request message (1700) to SRM S. Its data structure consists of a Transaction Header (1702), a Security Header (1704), an Application Header (1706) and an Application Payload (1708).

The Transaction Header contains a LSO/PSO identification number, a transaction identifier, and a magic cookie value.

The Security Header contains the Security Client A's Security Identifier (SID), the SRM Identifier, and one or more random PAKE key indices to be used in selecting one or more PAKE keys.

The Application Header contains a function number (to initiate an encrypted PAKE request message).

The Application Payload may contain message data useful to the receiving PSO.

SRM S sends a 1$^{st}$ PAKE Response message (1710) to Security Client A. It's data structure consists of a Transaction Header (1712), a Security Header (1714), and an Encrypted Security Payload (1716) that is encrypted with one or more keys K$_{AS}$ selected by using Key Indices I$_A$ from the Security Client A and I$_S$ from the SRM S. Inside the Encrypted Security Payload are the Application Header (1718) and the Application Payload (1720).

The Transaction Header contains the LSO/PSO identification number, a transaction identifier, a magic cookie value (copied from the request), an error code (if necessary).

The Security Header contains the Security Client A's Security Identifier (SID), the SRM Identifier, one or more random PAKE key indices to be used in selecting one or more PAKE keys, an error code (if necessary), and a one-way hash, which is encrypted with the 1$^{st}$ PAKE keys K$_{AS}$, of the Security Header and Encrypted Security Payload.

The Encrypted Security Payload (1716) is encrypted with the 1$^{st}$ PAKE keys, K$_{AS}$.

The Application Header (1718) contains an error code (if necessary).

The Application Payload (1720) contains a PAKE Certificate (1722) and one or more Transaction Keys K$_S$. It also may have a Timestamp and Nonce to defeat certain types of attacks, and any message data useful to the receiving LSO.

Security Client A sends a 2$^{nd}$ PAKE Request message (1724) to SRM S. Its data structure consists of a Transaction Header (1702), a Security Header (1726), and a clear Security Payload (1728) and an Encrypted Security Payload (1732). Inside the Encrypted Security Payload are an Application Header (1734) and an Application Payload (1736).

The Transaction Header contains a LSO/PSO identification number, a transaction identifier, and a magic cookie value.

The Security Header contains the Security Client A's Security Identifier (SID), the SRM Identifier, one or more random PAKE key indices I'$_S$ to be used in selecting one or more PAKE keys, and a one-way hash, which is encrypted with the Transaction Keys K$_S$, of the Security Header and Encrypted Security Payload portions of the message.

The Encrypted Security Payload is encrypted with the Transaction keys, K$_S$.

The Application Header contains a function number (to get a Session Certificate).

The Application Payload may contain a timestamp, a nonce, and message data useful to the receiving PSO.

SRM S sends a $2^{nd}$ PAKE Response message (1738) to Security Client A. It's data structure consists of a Transaction Header (1712), a Security Header (1740), and an Encrypted Security Payload (1742) that is encrypted with one or more keys $K'_{AS}$ selected by using Key Indices $I'_A$ from the Security Client A and $I'_S$ from the SRM S. Inside the Encrypted Security Payload are the Application Header (1744) and the Application Payload (1746).

The Transaction Header contains the LSO/PSO identification number, a transaction identifier, a magic cookie value, an error code (if necessary).

The Security Header contains the Security Client A's Security Identifier (SID), the SRM Identifier, one or more random PAKE key indices to be used in selecting one or more PAKE keys, an error code (if necessary), and a one-way hash, which is encrypted with the $2^{nd}$ PAKE keys $K'_{AS}$, of the Security Header and Encrypted Security Payload that is.

The Encrypted Security Payload is encrypted with the $2^{nd}$ PAKE keys, $K'_{AS}$.

The Application Header contains an error code (if necessary).

The Application Payload contains a Session Certificate (1748) and one or more Session Keys to allow Security Client A and SRM S to communicate securely. It also may have a Timestamp and Nonce to defeat certain types of attacks, and any message data useful to the receiving LSO.

Figure 18:
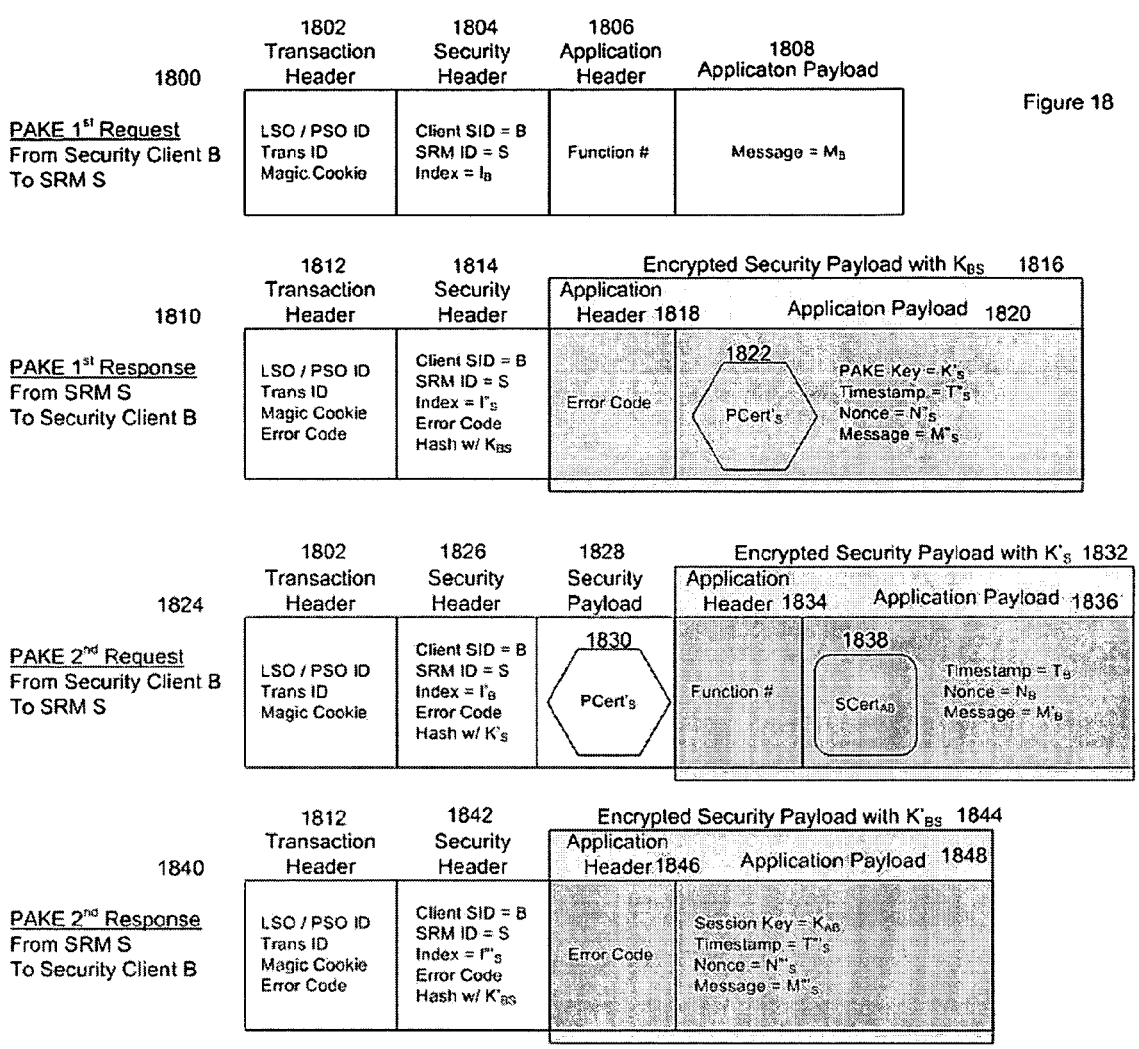
FIG. 18 depicts a diagram illustrating one embodiment of the PAKE request and response message formats between a User Agent B and a Secure Reference Monitor.

Referring to FIG. 18, this illustrates an embodiment of the data structure of the 4-pass PAKE transaction messages between Security Client B and SRM S.

Security Client B sends a $1^{st}$ PAKE Request message (1800) to SRM S. Its data structure consists of a Transaction Header (1802), a Security Header (1804), an Application Header (1806) and an Application Payload (1808).

The Transaction Header contains a LSO/PSO identification number, a transaction identifier, and a magic cookie value.

The Security Header contains the Security Client B's Security Identifier (SID), the SRM Identifier, and one or more random PAKE key indices to be used in selecting one or more PAKE keys.

The Application Header contains a function number (to initiate an encrypted PAKE request message).

The Application Payload may contain message data useful to the receiving PSO.

SRM S sends a $1^{st}$ PAKE Response message (1810) to Security Client B. It's data structure consists of a Transaction Header (1812), a Security Header (1814), and an Encrypted Security Payload (1816) that is encrypted with one or more keys selected by using key indices $I_B$ from the Security Client B and $I''_B$ from the SRM S. Inside the Encrypted Security Payload are the Application Header (1818) and the Application Payload (1820).

The Transaction Header contains the LSO/PSO identification number, a transaction identifier, a magic cookie value (copied from the request), an error code (if necessary).

The Security Header contains the Security Client B's Security Identifier (SID), the SRM Identifier, one or more random PAKE key indices to be used in selecting one or more PAKE keys, an error code (if necessary), and a one-way hash, which is encrypted with the PAKE keys $K_{BS}$, of the Security Header and Encrypted Security Payload.

The Encrypted Security Payload is encrypted with the $1^{st}$ PAKE keys, $K_{BS}$.

The Application Header contains an error code (if necessary).

The Application Payload (1818) contains a PAKE Certificate (1822) and one or more Transaction Keys, $K'_S$. It also may have a Timestamp and Nonce to defeat certain types of attacks, and any message data useful to the receiving LSO.

Security Client B sends a $2^{nd}$ PAKE Request message (1824) to SRM S. Its data structure consists of a Transaction Header (1802), a Security Header (1826), and a clear Security Payload (1828) and an Encrypted Security Payload (1830). Inside the Encrypted Security Payload are an Application Header (1834) and an Application Payload (1836).

The Transaction Header contains a LSO/PSO identification number, a transaction identifier, and a magic cookie value.

The Security Header contains the Security Client A's Security Identifier (SID), the SRM Identifier, one or more random PAKE key indices to be used in selecting one or more PAKE keys, and a one-way hash, which is encrypted with the Transaction keys $K'_S$, of the Security Header and Encrypted Security Payload portions of the message.

The Encrypted Security Payload is encrypted with the Transaction keys, $K'_S$.

The Application Header contains a function number (to get a Session Certificate).

The Application Payload contains a Session Certificate (1838) and may contain a timestamp, a nonce, and message data useful to the receiving PSO.

SRM S sends a $2^{nd}$ PAKE Response message (1840) to Security Client A. It's data structure consists of a Transaction Header (1812), a Security Header (1842), and an Encrypted Security Payload (1844) that is encrypted with one or more PAKE keys $K'_{BS}$ selected by using key indices $I'_B$ the Security Client B and $I'''_S$ from the SRM S. Inside the Encrypted Security Payload are the Application Header (1846) and the Application Payload (1848).

The Transaction Header contains the LSO/PSO identification number, a transaction identifier, a magic cookie value, an error code (if necessary).

The Security Header contains the Security Client B's Security Identifier (SID), the SRM Identifier, one or more random PAKE key indices to be used in selecting one or more PAKE keys $K'_{BS}$, an error code (if necessary), and a one-way hash, which that is encrypted with the PAKE keys $K'_{BS}$, of the Security Header and Encrypted Security Payload.

The Encrypted Security Payload is encrypted with the $2^{nd}$ PAKE keys, $K'_{BS}$.

The Application Header contains an error code (if necessary).

The Application Payload contains one or more Session Keys to allow Security Clients A and B to communicate securely. It also may have a Timestamp and Nonce to defeat certain types of attacks, and any message data useful to the receiving LSO.

Figure 19:
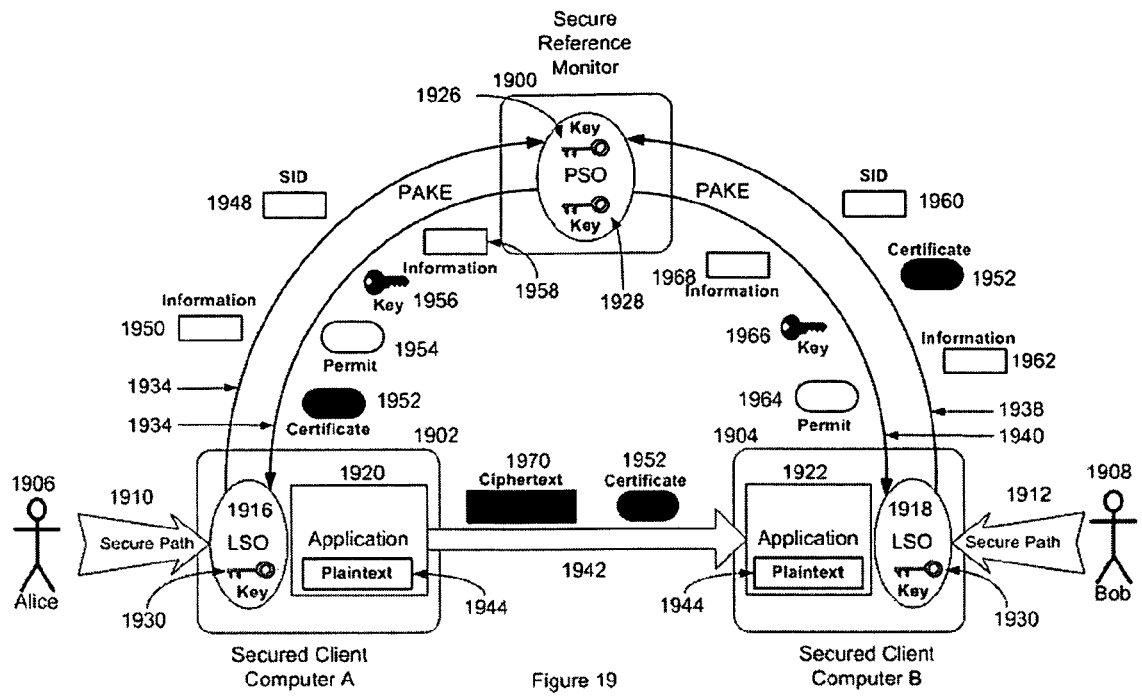
FIG. 19 depicts a diagram illustrating one embodiment of the system showing the physical and cryptographic pathways and data flows among authorized users, secured client computers and a Secure Reference Monitor.

Referring to FIG. 19, this illustrates the how users, logical components inside the SRM and Secured Client Computers, certificates, permits, and keys interoperate to encrypt a plaintext into a ciphertext and to decrypt the ciphertext back to plaintext. User Alice (1906) securely identifies herself via a Secure Path (1910) to an LSO (1916) in Secured Client Computer A (1902). She intends to use an Application (1920), say a VoIP softphone, to communicate securely with another Application (1922), say a SIP phone, at Secured Client Computer B (1904). This allows the LSO to use PAKE Key Material (1930) to be used to secure a PAKE request message (1934) to a PSO (1914) on the SRM (1900). The PAKE request can carry a Security Identifier (SID, 1948) and Information (1950) needed by the PSO to authorize the request.

One embodiment of a SID is a unique number divided into two parts; a locally unique number assigned to a user or computing device or software application by the SRM during an enrollment process and a globally unique number assigned to the SRM as the trusted representative of the security domain of users, devices and applications. This SID is bound to the unique, random PAKE Key Material, and is used to represent an enrolled, valid user, computing device or software application. Later it may have replacement PAKE Key Material bound to it, so PAKE Key Materials are fundamentally transitory in nature and are used by a PSO to establish trust in a LSO's cleartext SID received in any PAKE request message. The LSO SID number is an index used by the PSO to lookup the LSO's corresponding PAKE Key Material.

The Information (1250) may contain the type of the request. One embodiment is to use a number for the method to get a new Session Certificate (1952), Permit (1954) and Session Key Material (1956), or another number for the method to submit an existing Session Certificate (1952) and receive the corresponding Permit (1964) and Session Key Material (1956). It may also contain extra Information (1958), such as a current IP address (assigned via DHCP) of the Secured Client Computer A's NIC that may be used to dynamically map it's SID with it's more transitory IP addresses.

One embodiment of PAKE is a simple transaction, a cleartext request message and a mutually authenticated ciphertext response message, with identification and authorization operations on the SRM combined together and using well-known transaction processing atomicity and consistency techniques. The response uses a PAKE Key (1926) mutually selected from a set of PAKE Keys, or derived from a large amount of PAKE Key Material, by two sets of random key indices, one set generated by the LSO (1916) and the other by the PSO (1914).

Another preferred embodiment of PAKE are two transactions, the first with a cleartext request and a mutually authenticated ciphertext response, as described before, containing a PAKE Certificate and a Transaction Key generated by the SRM's PRNG for the second transaction's request ciphertext with the Certificate and it's mutually authenticated ciphertext response (identical in mechanism to the first response).

PAKE can also use one of the well-known cryptographic protocols used for authentication and key exchange, either Public Key or Symmetric Key cryptography based, which require more than two messages to be exchanged during the transaction. Note that the PAKE Key Materials would contain shared secret cryptographic materials utilized by the protocol. An embodiment is the PAKE Key Materials 1926 and 1930 are symmetric and identical, and that PAKE Key Materials 1928 and 1932 are symmetric and identical too, but they can differ from each other if they are asymmetric keys (such as RSA keys).

Another embodiment of PAKE is a symmetric key based Needham-Schroeder Key Exchange Protocol between the LSO and SRM's corresponding PSO, followed by a final transaction to get a Session Key Material, etc., using the newly exchanged Transaction Key.

Another embodiment of PAKE is a Public Key based authenticated Diffie-Hellman Key Exchange Protocol between the LSO and SRM's corresponding PSO, followed by a final transaction to get Session Key Material, etc., using the newly exchanged Transaction Key. Note that the PAKE Key Material would contain shared secret and public cryptographic materials utilized by the protocol.

One embodiment of a Session Certificate (1952) is a unique serial number assigned by the PSO, identifying a Permit (1954), that is encrypted with a private symmetric key known only to the PSO. The Session Certificate's encryption key identifier and its cryptographic signature (i.e. the hash value of encrypted Session Certificate that is in turn encrypted also), which may also have another key identifier associated with it, are attached to the Session Certificate. This type of Session Certificate is stateless, because it does not contain label information, session keys or user identification, etc. The LSO (1916) cannot decrypt the Session Certificate (1952) in order to examine its contents; this can only be done by the PSO (1914). One embodiment of the Permit Identifier (PID) inside the Session Certificate is an index to a Permit Table (408) row in the PSO's database (504). This row will contain mandatory access control (MAC) information (such as information used to derive an LSO's PAKE keys), and could also contain discretionary access control (DAC) information.

One embodiment of the Permit (1954) when it is delivered to the LSO via a PAKE response message (1936) is that it contains only DAC information.

The delivery via the mutually authenticated encrypted PAKE response message (1936) of the Session Key Material (1956) to the LSO's Policy Enforcement component (706 or 906 or 1106) supports MAC.

Any useful Information (1958) that is not DAC can also be delivered to the LSO, for example the current IP address (assigned via DHCP) of the destination Secured Client Computer B.

The LSO (1916) in coordination with the Application (1920) uses the Session Key Material (1956) to encrypt a plaintext VoIP message (1944) into a ciphertext message (1970). VoIP messages are SIP, RTP, RTCP and other types of VoIP messages (such as H.323). Encryption could be done on behalf of the Application by the LSO, say in a tamper resistant cryptographic hardware component (614 or 814 or 1014). Or Session Key Material (1956) could be given to the Application (1920) that could use either a software or hardware cryptographic component to encrypt the message. Other standard cryptographic techniques could be applied to the message, such as a cryptographic signature (encrypted one-way hash or digest) to provide message integrity.

Prior to transmitting the encrypted VoIP packet the Session Certificate (1952) is sent (1942) from the sender Application (1920) on the Security Client Computer A (1902) to the receiver Application (1922) on the Security Client Computer B (1904). The LSO (1918) on Security Client Computer B (1904) is has PAKE Key Material (1932) via a Secure Path (1912) with User Bob (1908).

When this LSO (1918) has received the Certificate (1952) then a PAKE request message (1938) is sent to the PSO (1914). The PSO (1914) has the corresponding PAKE Key Material (1928) to authenticate the PAKE request message. The PAKE request message contains the Session Certificate (1952) that was received from the Application on A, the SID (1960), and any other useful Information (1962), for example, a dynamic IP address assigned to the Secured Client Computer B.

The PSO Policy Adjudication component (404) decides to send a PAKE response message (1940) with a secured Permit (1964), Session Key Material (1956) and Information (1968). The Permit is used by the LSO's Policy Enforcement (706 or 906 or 1106) component to enforce DAC (at the LSO's discretion). The Session Key Material (1956) is used to enforce MAC. And Information (1968) is anything else that may be of use to either the LSO (1918) or the Application (1922) on B, such as the IP address of A.

The Application on A sends the Ciphertext VoIP packet to B (1970). The LSO or Application on B uses their Session Key Material (1956) to decrypt it and recover the Plaintext VoIP message (1944). One embodiment is this Session Key Material (1956) on Computer B (1904) to be identical to the Session Key Material (1956) on Computer A (1902) used to encrypt the VoIP message.

Figure 20:
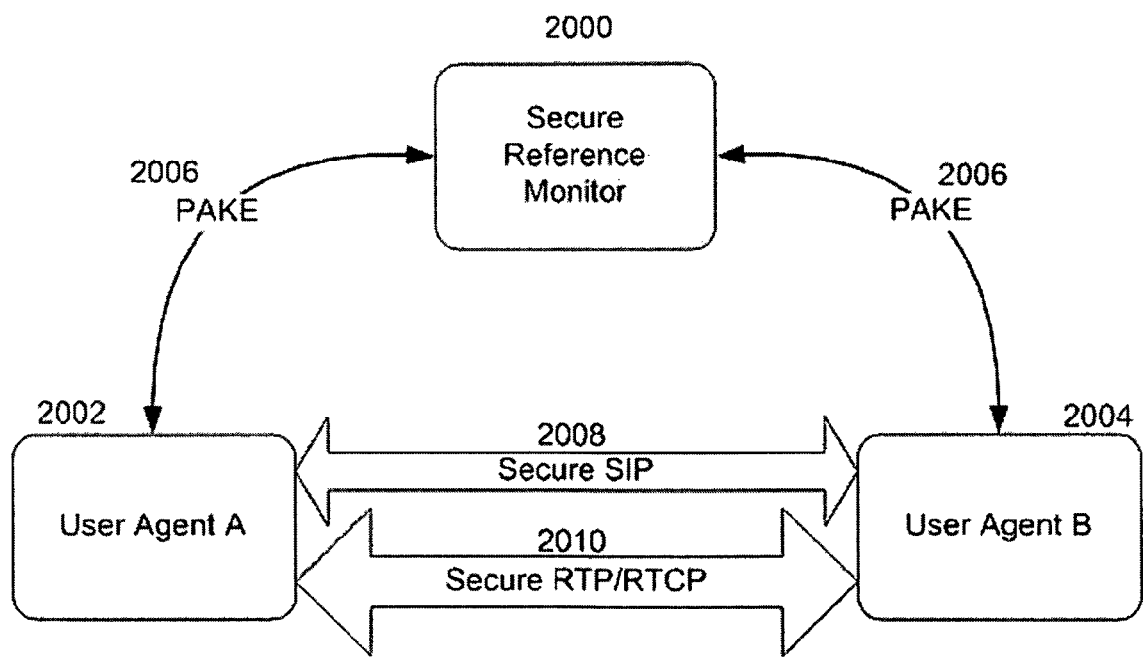
FIG. 20 depicts a diagram illustrating one embodiment of the communications among User Agents and a Secure Reference Monitor.

Referring to FIG. 20, this illustrates a successful secure SIP session (2008) establishment of secure RTP/RTCP communications (2010) between User Agents A (2002) and B (2004) with an SRM (2000) using PAKE transactions (2006).

Figure 21:
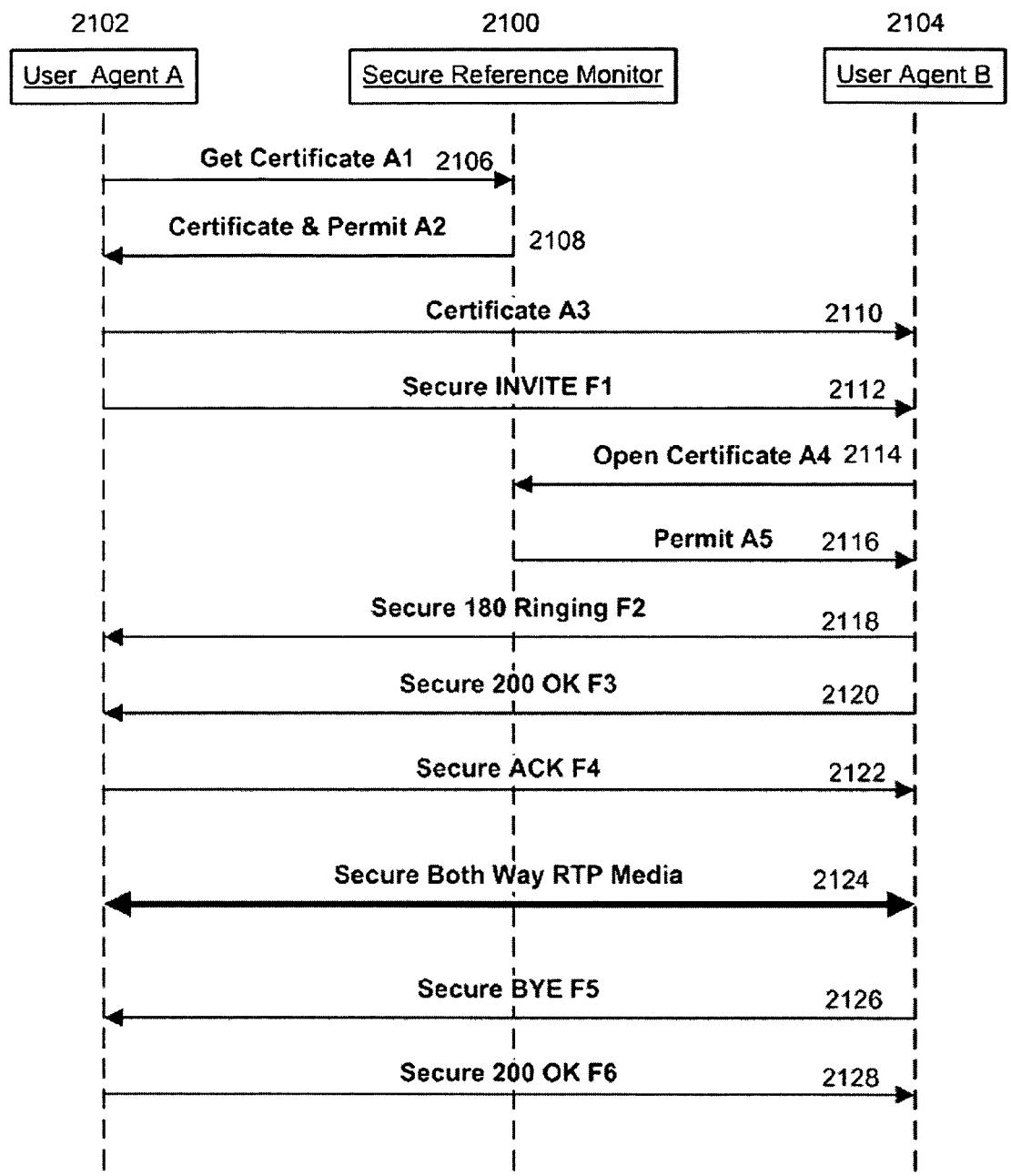
FIG. 21 depicts a time sequence diagram illustrating a set of messages among User Agents and a Secure Reference Monitor.

Referring to FIG. 21, this illustrates the sequence of PAKE and secure SIP messages between the SRM (2100), User Agents A (2102) and B (2104) to establish secure RTP and RTCP media communications.

User Agent A sends a PAKE request (2106) to the SRM to get a new Session Certificate, for establishing secure SIP and RTP/RTCP communications with User Agent B. The SRM sends a PAKE response (2108) with the Session Certificate, a Permit, Session Key Material and any Information needed, such as User Agent B's current IP address. User Agent A sends the Certificate to User Agent B (2110). He then sends a secure SIP INVITE message to User Agent B using the Session Key Material to encrypt it (2112). Alternatively these two messages could be combined into one INVITE message with the Session Certificate as an extra field. User Agent B sends a PAKE request the SRM to open the Session Certificate (2114). The SRM sends a PAKE response with a Permit, Session Key Material and any Information needed (2116). User Agent B sends a secure SIP 180 Ringing message to User Agent A using the Session Key Material to encrypt it (2118). Then User Agent B sends a secure SIP 200 OK message to User Agent A (2120). User Agent A sends a secure SIP ACK message to User Agent B (2122). Both agents then use the shared Session Key Material to encrypt the RTP and RTCP packets that flow both ways between them (2124). Terminating the flow, User Agent B sends a secure SIP BYE message to User Agent A (2126). User Agent A responds with a secure SIP 200 OK message (2128). Both User Agents discard the shared Session Key Material.

Referring to FIG. 22, this illustrates a normal SIP message format between User Agents A and B. The SIP INVITE message header (2200) is followed by an SDP content body (2202) describing the parameters for setting up VoIP communications.

Referring to FIG. 23, this illustrates a secure SIP message format (Transport Mode) between User Agents A and B. The SIP INVITE message header (2300) has two additional fields, Security-Association (2306) and Secure-Signature (2308), and it's Content-Type (2310) and Content-Length fields are modified. The Tag field (2314) could be used in place of the Security-Association field. The SDP content body (2318) and the original SIP header fields (2316), Content-Type and Content-Length, are together (2304) and are encrypted and the binary is converted into text characters (2302) so a SIP parser can process it. The Security-Association is a unique identifier to help the User Agents look up the appropriate Session Key Material and any related information, such as encryption and hash algorithms to be used, etc. The Secure-Signature is an encrypted hash of both the SIP Header and the encrypted SDP content body. Other well-known techniques to mitigate protocol attacks can be used such as adding a nonce, a timestamp, etc., to the SIP header.

Referring to FIG. 24, this illustrates an alternate secure SIP message format between User Agents A and B (Tunnel Mode). The SIP INVITE message header and SDP body together (2404) have been encapsulated in a Secure SIP (SSIP) message. The SSIP message header (2400) has a SIP style first line (2406) followed by two lines for security, Security-Association (2408) and Secure-Signature (2410), and a SIP style Content-Type (2412) and Content-Length (2414) fields. The entire original SIP/SDP message (2404) is encrypted and the binary is converted into text characters (2402) so a SSIP parser can process it. The Security-Association is a unique identifier to help the User Agents look up the appropriate Session Key Material and any related information, such as encryption and hash algorithms to be used, etc. The Secure-Signature is an encrypted hash of both the SSIP header and the encrypted SIP/SDP content body. Other well-known techniques to mitigate protocol attacks can be used such as adding a nonce, a timestamp, etc., to the SSIP header.

Figure 25:
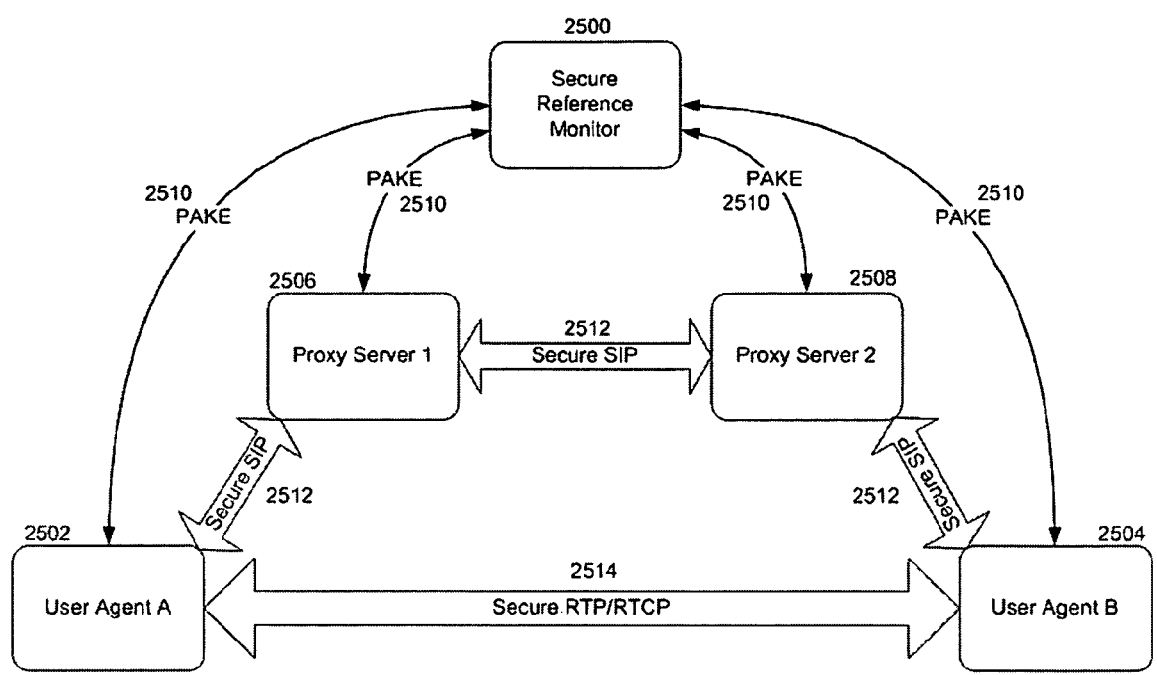
FIG. 25 depicts a diagram illustrating one embodiment of the communications among User Agents, Proxy Servers, and a Secure Reference Monitor.

Referring to FIG. 25, this illustrates successful secure SIP sessions (2512) establishment of a secure RTP/RTCP communications (2514) between User Agents A (2502) and B (2504) through Proxy Servers 1 (2506) and 2 (2508) with an SRM (2500) using PAKE transactions (2510).

Figure 26A:
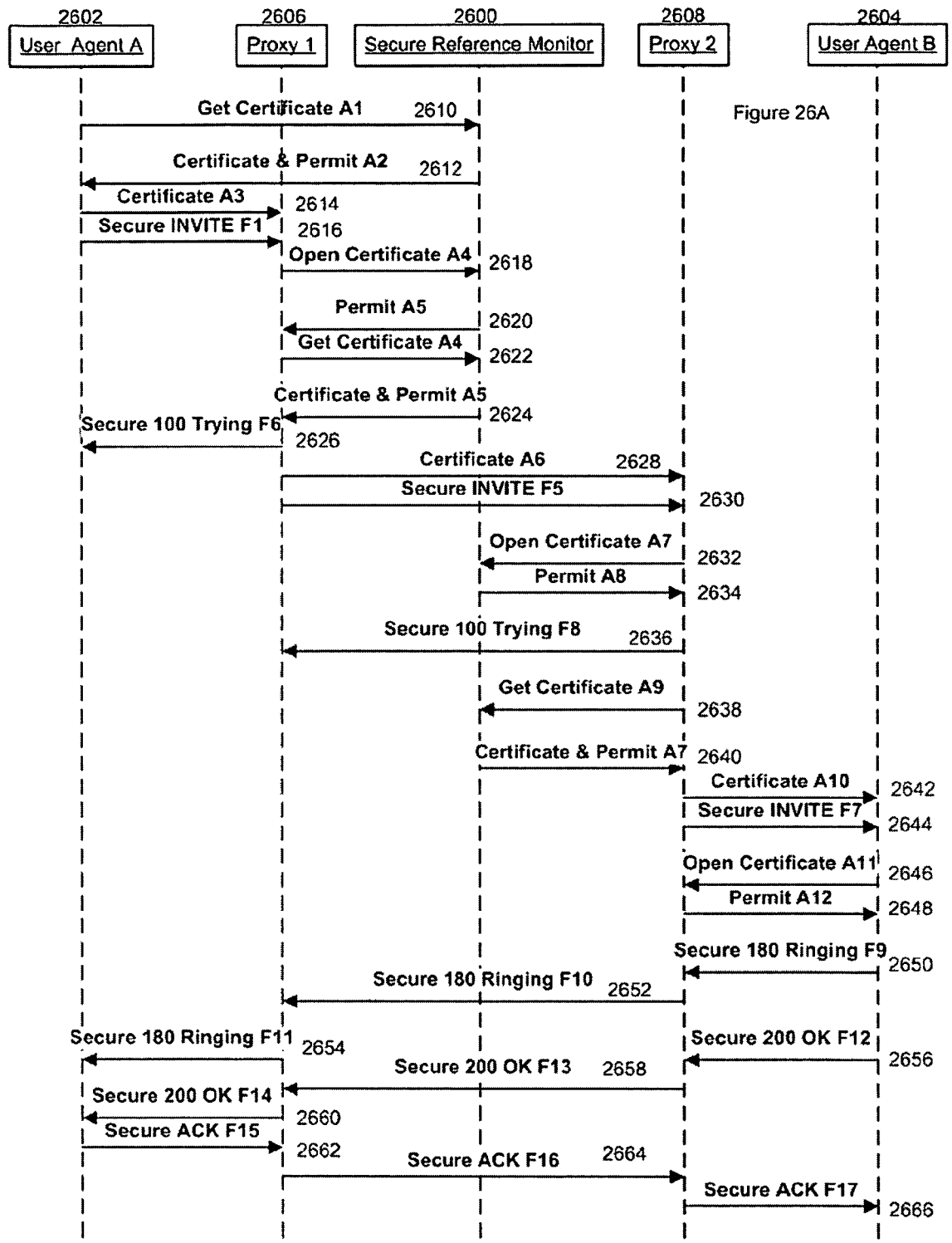
FIGS. 26A and 26B depict a time sequence diagram illustrating PAKE and secure VoIP message flows among User Agents, Proxy Servers, and a Secure Reference Monitor.
Figure 26B:
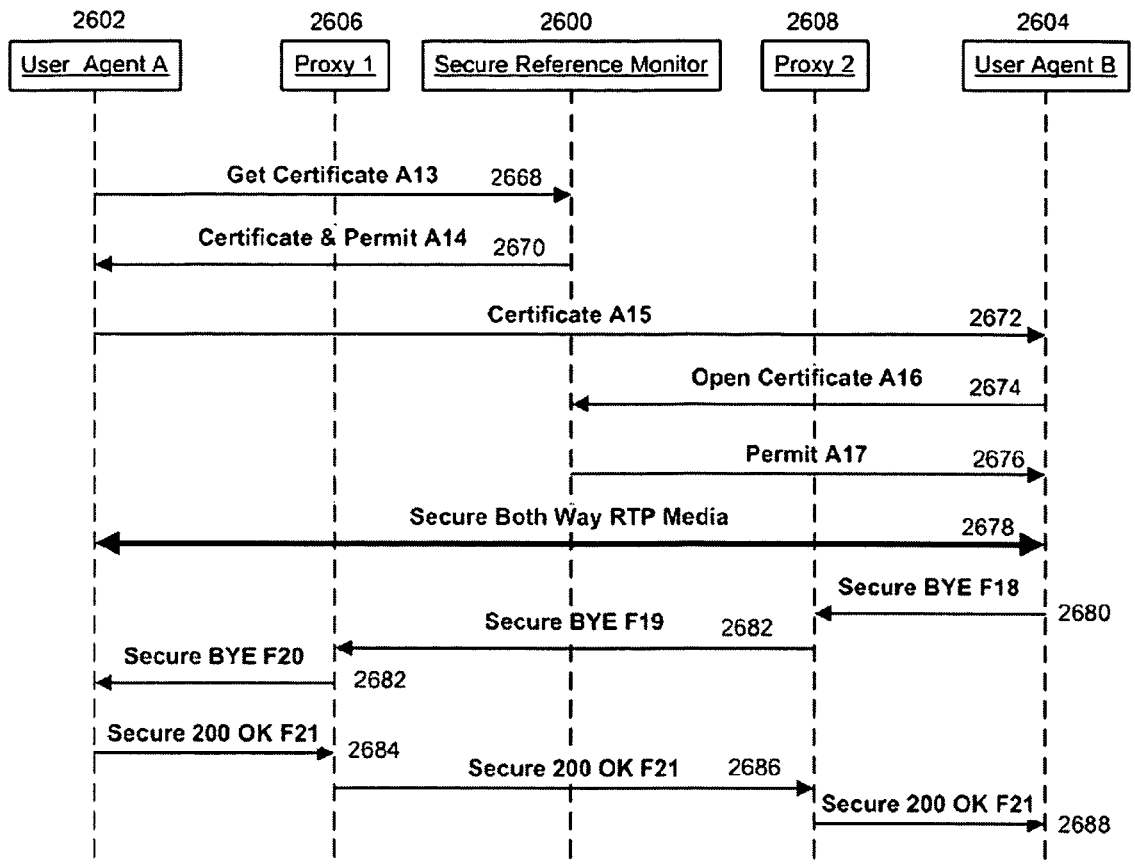

Referring to FIGS. 26A and 26B, these illustrate the sequence of PAKE and secure SIP messages between the SRM (2600), User Agents A (2602) and B (2604), Proxy Servers 1 (2606) and 2 (2608) to establish secure RTP and RTCP media communications.

User Agent A sends a PAKE request to the SRM to get a new Session Certificate, for establishing secure SIP communications with Proxy Server 1 (2610). The SRM sends a PAKE response to User Agent A with the first Session Certificate, a first Permit, first Session Key Material and any Information needed (2612).

User Agent A sends the first Session Certificate to Proxy Server 1 (2614). User Agent A then sends a secure SIP INVITE message to Proxy Server 1 using the first Session Key Material to encrypt it (2616).

Proxy Server 1 sends a PAKE request the SRM to open the first Session Certificate (2618). The SRM sends to Proxy Server 1 a PAKE response with the first Permit, the first Session Key Material and any Information needed (2620).

Proxy Server 1 sends a PAKE request to the SRM to get a new Session Certificate, for establishing secure SIP communications with Proxy Server 2 (2622). The SRM sends a PAKE response to Proxy Server 1 with a second Session Certificate, a second Permit, a second Session Key Material and any Information needed (2624).

Proxy Server 1 sends a secure SIP 100 Trying message to User Agent A using the first Session Key Material to encrypt it (2626).

Proxy Server 1 sends the second Session Certificate to Proxy Server 2 (2628). Proxy Server 1 then sends a secure SIP INVITE message to Proxy Server 2 using the second Session Key Material to encrypt it (2630).

Proxy Server 2 sends a PAKE request the SRM to open the second Session Certificate (2632). The SRM sends to Proxy Server 2 a PAKE response with the second Permit, the second Session Key Material and any Information needed (2634).

Proxy Server 2 sends a secure SIP 100 Trying message to Proxy Server 1 using the second Session Key Material to encrypt it (2636).

Proxy Server 2 sends a PAKE request to the SRM to get a new Session Certificate, for establishing secure SIP communications with User Agent B (2638). The SRM sends a PAKE response to Proxy Server 2 with a third Session Certificate, a third Permit, a third Session Key Material and any Information needed (2640).

Proxy Server 2 sends the third Session Certificate to User Agent B (2642). Proxy Server 2 then sends a secure SIP INVITE message to User Agent B using the third Session Key Material to encrypt it (2644).

User Agent B sends a PAKE request the SRM to open the third Session Certificate (2646). The SRM sends to User Agent B a PAKE response with the third Permit, the third Session Key Material and any Information needed (2648).

User Agent B sends a secure SIP 180 Ringing message to Proxy Server 2 using the third Session Key Material to encrypt it (2650).

Proxy Server 2 sends a secure SIP 180 Ringing message to Proxy Server 1 using the second Session Key Material to encrypt it (2652).

Proxy Server 1 sends a secure SIP 180 Ringing message to User Agent A using the first Session Key Material to encrypt it (2654).

User Agent B sends a secure SIP 200 OK message to Proxy Server 2 using the third Session Key Material to encrypt it (2656).

Proxy Server 2 sends a secure SIP 200 OK message to Proxy Server 1 using the second Session Key Material to encrypt it (2658).

Proxy Server 1 sends a secure SIP 200 OK message to User Agent A using the first Session Key Material to encrypt it (2660).

User Agent A sends a secure SIP ACK message to Proxy Server 1 using the first Session Key Material to encrypt it (2662).

Proxy Server 1 sends a secure SIP ACK message to Proxy Server 2 using the second Session Key Material to encrypt it (2664).

Proxy Server 2 sends a secure SIP ACK message to User Agent B using the third Session Key Material to encrypt it (2666).

User Agent A sends a PAKE request to the SRM to get a new Session Certificate, for establishing secure RTP/RTCP communication with User Agent B (2668). The SRM sends a PAKE response to User Agent A with a fourth Session Certificate, a fourth Permit, a fourth Session Key Material and any Information needed (2670).

User Agent A sends the 4$^{th}$ Session Certificate to User Agent B (2672). User Agent B sends a PAKE request the SRM to open the Session Certificate (2674). The SRM sends a PAKE response with a fourth Permit, a fourth Session Key Material and any Information needed (2676).

Both agents then use the shared fourth Session Key Material to encrypt the RTP and RTCP packets that flow both ways between them (2678).

Terminating the flow, User Agent B sends a secure SIP BYE message to Proxy Server 2 using the third Session Key Material to encrypt it (2680).

Proxy Server 2 sends a secure SIP BYE message to Proxy Server 1 using the second Session Key Material to encrypt it (2682).

Proxy Server 1 sends a secure SIP BYE message to User Agent A using the first Session Key Material to encrypt it (2684).

User Agent A sends a secure SIP 200 OK message to Proxy Server 1 using the first Session Key Material to encrypt it (2686).

Proxy Server 1 sends a secure SIP 200 OK message to Proxy Server 2 using the second Session Key Material to encrypt it (2688).

Proxy Server 2 sends a secure SIP 200 OK message to User Agent B using the third Session Key Material to encrypt it (2690).

User Agent A and Proxy Server 1 may discard the shared first Session Key Material or keep it for future use depending on what their first Permit allows.

Both Proxy Servers may discard the shared second Session Key Material or keep it for future use depending on what their second Permit allows.

Proxy Server 2 and User Agent B may discard the shared third Session Key Material or keep it for future use depending on what their first Permit allows.

Both User Agents discard the shared fourth Session Key Material.

Figure 27:
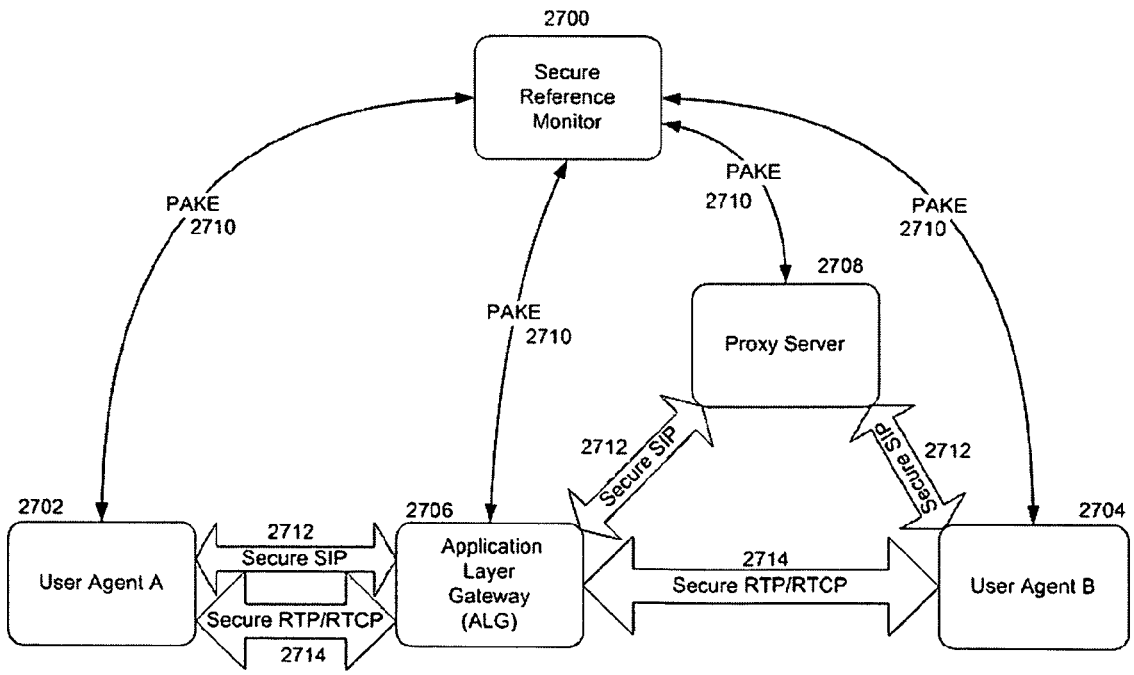
FIG. 27 depicts a diagram illustrating one embodiment of the communications among User Agents, an Application Layer Gateway, a Proxy Server, and a Secure Reference Monitor.

Referring to FIG. 27, this illustrates successful secure SIP sessions establishment (2712) of a first secure RTP/RTCP communications (2714) between User Agent A (2702) and an ALG (2706) with an SRM (2700) using PAKE transactions (2710), and a second secure RTP/RTCP communications (2714) between the ALG and a User Agent B (2704) through a Proxy Server (2708) with the SRM using PAKE transactions.

Figure 28B:
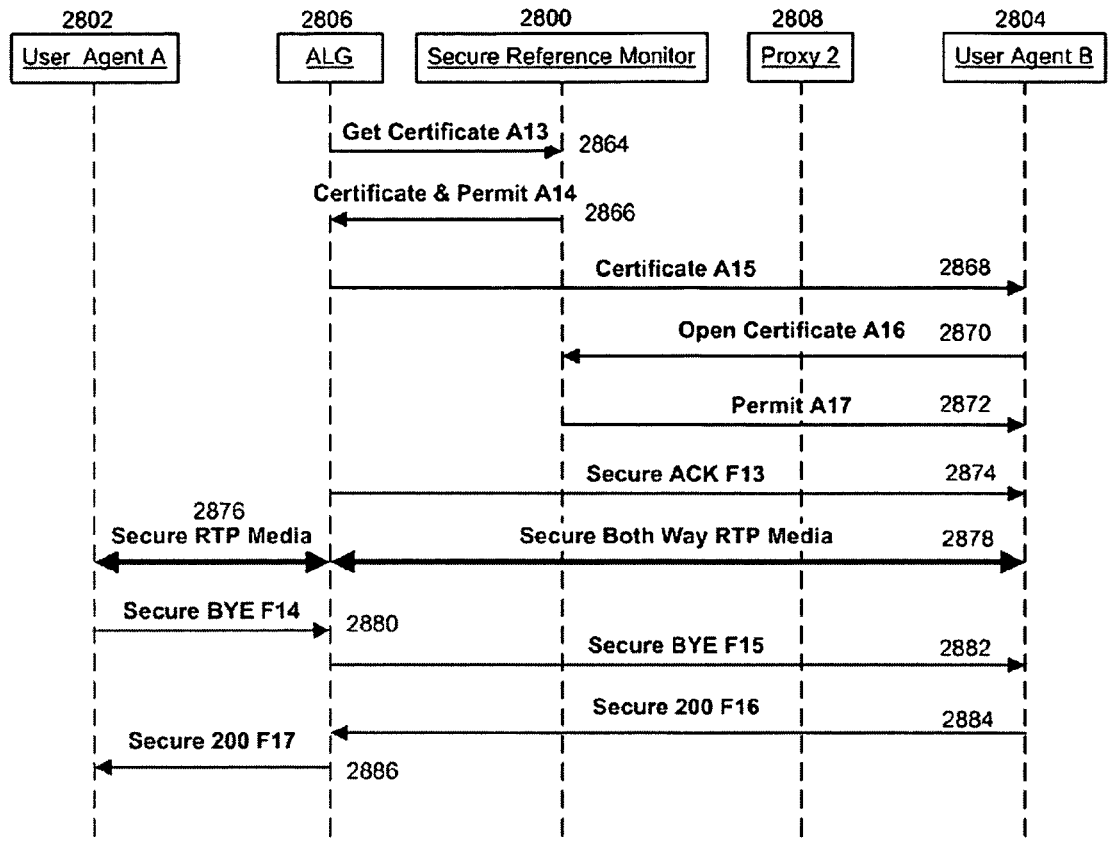

Referring to FIGS. 28A and 28B, these illustrate the sequence of PAKE and secure SIP messages between the SRM (2800), User Agents A (2802) and B (2804), an ALG (2806), and a Proxy Server (2808) to establish secure RTP and RTCP media communications.

User Agent A sends a PAKE request to the SRM to get a new Session Certificate (2810), for establishing secure SIP communications and secure RTP/RTCP communications with the Application Layer Gateway. The SRM sends a PAKE response to User Agent A with the first Session Certificate, a first Permit, a first Session Key Material and any Information needed (2812).

User Agent A sends the first Session Certificate to the Application Layer Gateway (2814). User Agent A then sends a secure SIP INVITE message to the Application Layer Gateway using the first Session Key Material to encrypt it (2816).

Application Layer Gateway sends a PAKE request the SRM to open the first Session Certificate (2818). The SRM sends to the Application Layer Gateway a PAKE response with the first Permit, the first Session Key Material and any Information needed (2820).

The Application Layer Gateway sends a PAKE request to the SRM to get a new Session Certificate, for establishing secure SIP communications with the Proxy Server (2822). The SRM sends a PAKE response to the Application Layer Gateway with a second Session Certificate, a second Permit, a second Session Key Material and any Information needed (2824).

The Application Layer Gateway sends a secure SIP 100 Trying message to User Agent A using the first Session Key Material to encrypt it (2826).

The Application Layer Gateway sends the second Session Certificate to the Proxy Server (2828). The Application Layer Gateway then sends a secure SIP INVITE message to the Proxy Server using the second Session Key Material to encrypt it (2830).

The Proxy Server sends a PAKE request the SRM to open the second Session Certificate (2832). The SRM sends to the Proxy Server a PAKE response with the second Permit, the second Session Key Material and any Information needed (2834).

Proxy Server sends a secure SIP 100 Trying message to Application Layer Gateway using the second Session Key Material to encrypt it (2836).

The Proxy Server sends a PAKE request to the SRM to get a new Session Certificate, for establishing secure SIP communications with User Agent B (2838). The SRM sends a PAKE response to the Proxy Server with a third Session Certificate, a third Permit, a third Session Key Material and any Information needed (2840).

The Proxy Server sends the third Session Certificate to User Agent B (2842). The Proxy Server then sends a secure SIP INVITE message to User Agent B using the third Session Key Material to encrypt it (2844).

User Agent B sends a PAKE request the SRM to open the third Session Certificate (2846). The SRM sends to User Agent B a PAKE response with the third Permit, the third Session Key Material and any Information needed (2848).

User Agent B sends a secure SIP 180 Ringing message to the Proxy Server using the third Session Key Material to encrypt it (2850).

Proxy Server sends a secure SIP 180 Ringing message to the Application Layer Gateway using the second Session Key Material to encrypt it (2852).

The Application Layer Gateway sends a secure SIP 180 Ringing message to User Agent A using the first Session Key Material to encrypt it (2854).

User Agent B sends a secure SIP 200 OK message to the Proxy Server using the third Session Key Material to encrypt it (2856).

The Proxy Server sends a secure SIP 200 OK message to the Application Layer Gateway using the second Session Key Material to encrypt it (2858).

The Application Layer Gateway sends a secure SIP 200 OK message to User Agent A using the first Session Key Material to encrypt it (2860).

User Agent A sends a secure SIP ACK message to Application Layer Gateway using the first Session Key Material to encrypt it (2862).

The ALG sends a PAKE request to the SRM to get a new Session Certificate, for establishing secure RTP/RTCP communication with User Agent B (2864). The SRM sends a PAKE response to the ALG with a fourth Session Certificate, a fourth Permit, a fourth Session Key Material and any Information needed (2866).

The ALG sends the fourth Session Certificate to User Agent B (2868).

User Agent B sends a PAKE request the SRM to open the fourth Session Certificate (2870). The SRM sends a PAKE response to User Agent B with a fourth Permit, a fourth Session Key Material and any Information needed (2872).

The Application Layer Gateway sends a secure SIP ACK message to User Agent B using the fourth Session Key Material to encrypt it (2874).

User Agent A and ALG then use the shared first Session Key Material to encrypt the RTP and RTCP packets that flow both ways between them (2876).

The ALG and User Agent B then use the shared fourth Session Key Material to encrypt the RTP and RTCP packets that flow both ways between them (2878).

Terminating the flow, User Agent A sends a secure SIP BYE message to the ALG using the first Session Key Material to encrypt it (2880).

The ALG sends a secure SIP BYE message to User Agent B using the fourth Session Key Material to encrypt it (2882).

User Agent B sends a secure SIP 200 OK message to the Application Layer Gateway using the fourth Session Key Material to encrypt it (2884).

The Application Layer Gateway sends a secure SIP 200 OK message to User Agent A using the first Session Key Material to encrypt it (2886).

User Agent A and the Application Layer Gateway discard the shared first Session Key Material.

The ALG and the Proxy Server may discard the shared second Session Key Material or keep it for future use depending on what their second Permit allows.

The Proxy Server and User Agent B may discard the shared third Session Key Material or keep it for future use depending on what their first Permit allows.

The ALG and User Agent B discard the shared fourth Session Key Material.

Figure 29:
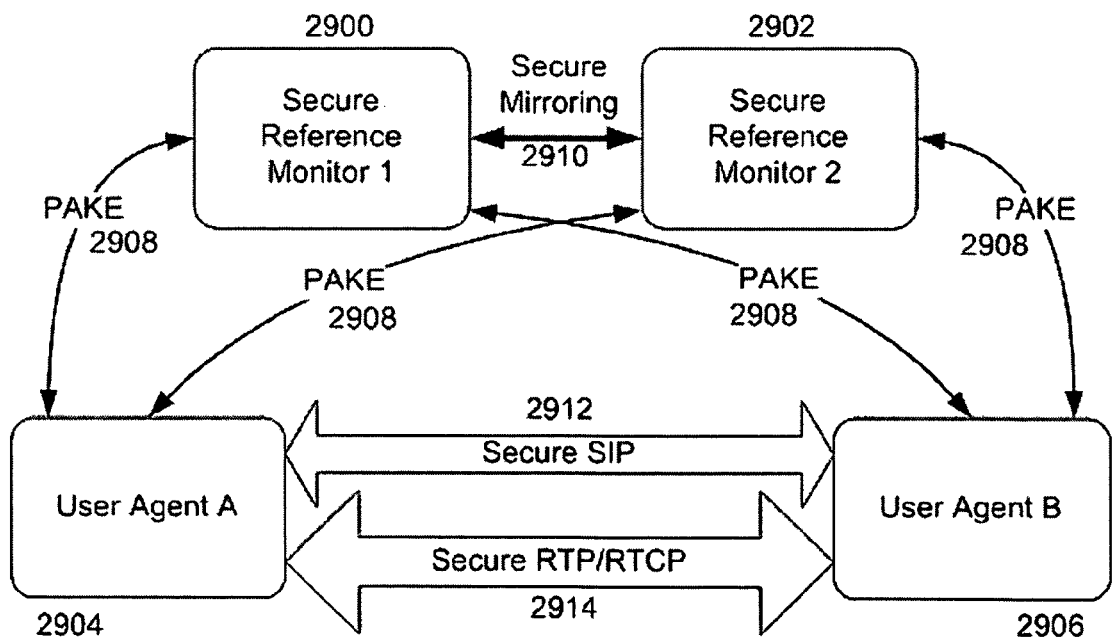
FIG. 29 depicts a diagram illustrating one embodiment of the communications among User Agents and mirrored Secure Reference Monitors.

Referring to FIG. 29, this illustrates a successful secure SIP session (2912) establishment of secure RTP/RTCP communications (2914) between User Agents A (2904) and B (2906) with either SRM 1 (2900) or SRM 2 (2902) using PAKE transactions (2908). SRM 1 and SRM 2 are mirroring each other's internal databases with a secure (physical or cryptographic) two-phase commit transaction protocol (2910).

One embodiment of mirrored SRMs using a LAN or a high performance, very reliable back channel is that both User Agents are doing PAKE transactions with SRM 1. If it fails to respond, because of hardware or software failure, then the User Agents can detect this via a PAKE response timeout, and redirect new PAKE requests to SRM 2.

Alternatively, the two SRM's could be load balancing with User Agent A using SRM 1 and User Agent B using SRM 2. If SRM 1 gets overloaded it could indicate this condition to User Agent A via a backoff flag in its PAKE responses and User Agent A could send some, or all, future PAKE requests to SRM 2.

Figure 30:
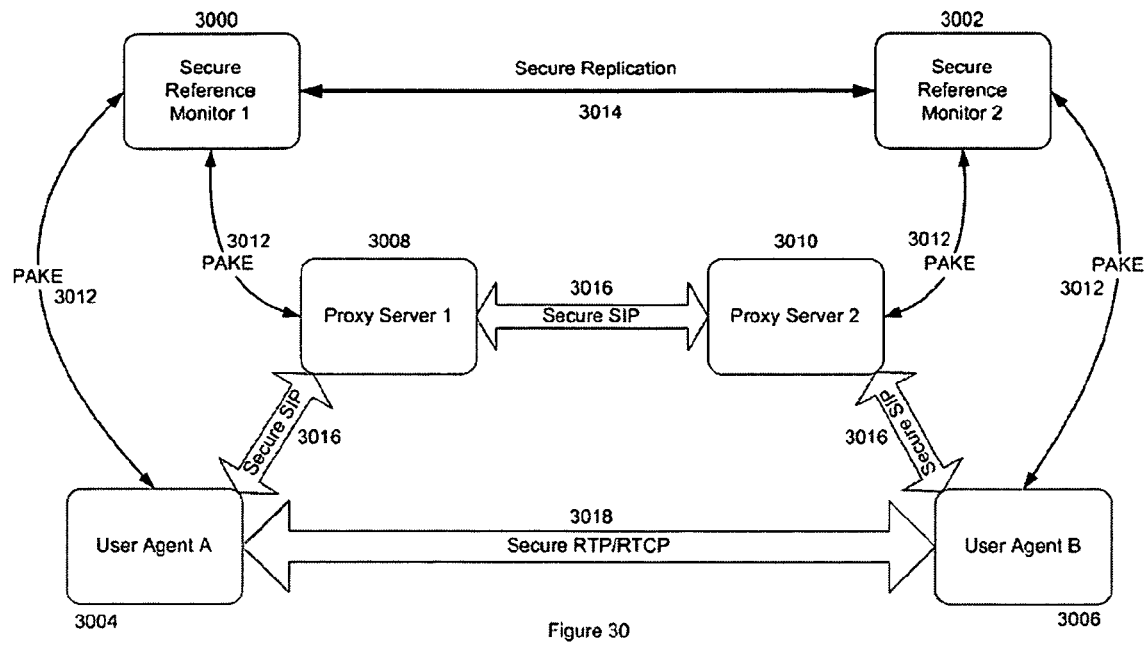
FIG. 30 depicts a diagram illustrating one embodiment of the communications among User Agents, Proxy Servers, and replicated Secure Reference Monitors.

Referring to FIG. 30, this illustrates successful establishment of secure SIP communications (3016) between an SRM and a Proxy Server or a User Agent with PAKE transactions (3012), and a successful secure SIP session establishment of secure RTP/RTCP communications (3018) between User Agent A (3004) and User Agent B (3006) with PAKE transactions (3012).

One embodiment is that SRM 1 (3000) and SRM 2 (3002) are replicating each others internal databases over a WAN with a secure (physical or cryptographic) replication protocol (3014) and where User Agent A and Proxy Server 1 (3008) only do PAKE transactions with SRM 1 and where User Agent B and Proxy Server 2 only do PAKE transactions with SRM 2 (3010).

Figure 31:
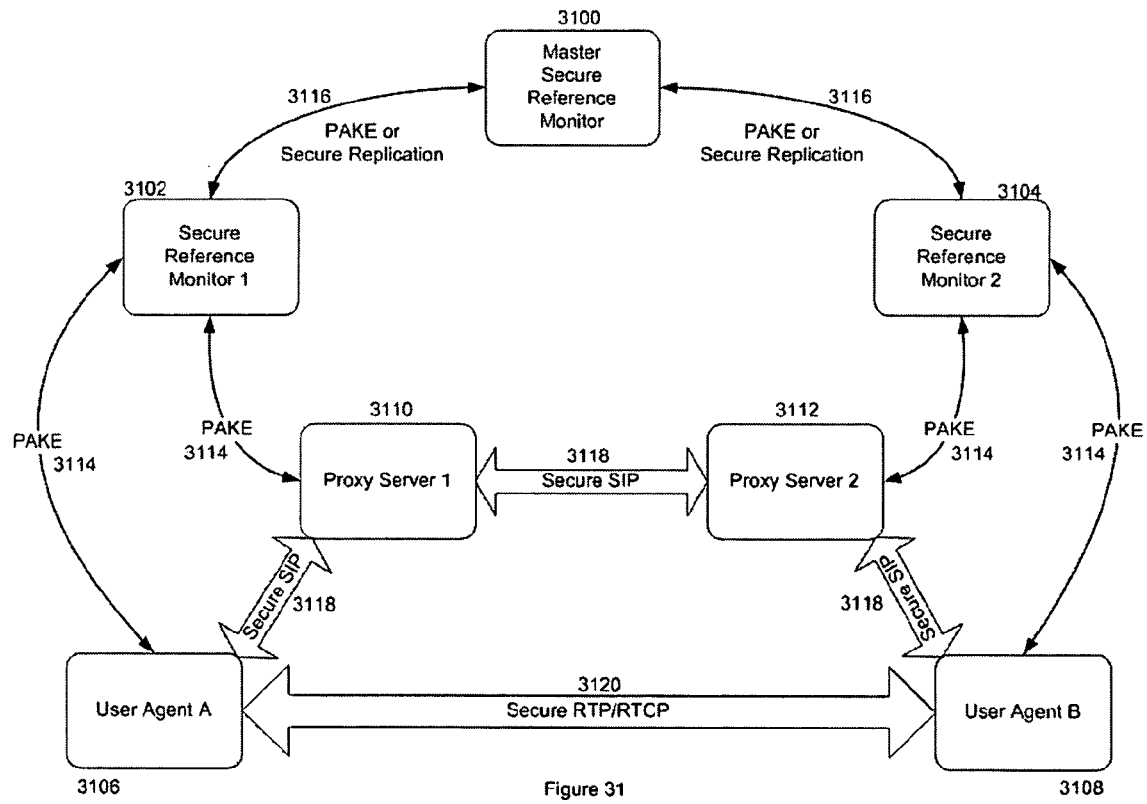
FIG. 31 depicts a diagram illustrating one embodiment of the communications among User Agents, Proxy Servers, and replicated Secure Reference Monitors with one of them being a master Secure Reference Monitor.

Referring to FIG. 31, this illustrates successful establishment of secure SIP communications (3118) between an SRM and a Proxy Server or a User Agent with PAKE transactions (3114), and a successful secure SIP session establishment of secure RTP/RTCP communications (3120) between User Agent A (3106) and User Agent B (3108) with PAKE transactions, One embodiment, illustrating a single distributed security domain or two peer coordinating security domains, is that SRM 1 (3102) and SRM 2 (3104) are replicating a Master SRM's (3100) database with a secure (via physically protected networking cable or cryptographic encryption) replication protocol (3116) and where User Agent A (3106) and Proxy Server 1 (3110) only do PAKE transactions with SRM 1 and where User Agent B (3108) and Proxy Server 2 (3112) only do PAKE transactions with SRM 2.

One embodiment, that illustrates two separate security domains coordinating with a higher level security domain, is that SRM 1 and SRM 2 are securely communication with a Master SRM with PAKE transactions and where User Agent A and Proxy Server 1 only do PAKE transactions with SRM 1 and where User Agent B and Proxy Server 2 only do PAKE transactions with SRM 2.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A method comprising:
receiving a first authenticated request encrypted by a first encryption key for communicating with a second client sent from a first client to a reference monitor;
transmitting a session certificate with a third encryption key from the reference monitor to the first client upon verifying the first encryption key, wherein the session certificate includes an encrypted permit identifier in accordance with a policy table in the reference monitor, wherein the permit identifier corresponds to an entry containing the session key in a table stored within the reference monitor;
encrypting data with the third encryption key at the first client;
transmitting the session certificate and the data from the first client to the second client;
transmitting a second authenticated request encrypted by a second encryption key for communicating with the first client with the session certificate sent from the second client to the reference monitor;
upon verifying the second authenticated request utilizing the second encryption key, decrypting the encrypted permit identifier at the reference monitor based on the session certificate transmitted from the second client to the reference monitor;
transmitting an authenticated response with the third encryption key as an encrypted session key from the reference monitor to the second client; and
decrypting encrypted data sent from the first client to the second client in response to the third encryption key.

2. The method according to claim 1 further comprising transmitting a transaction between the first client and the reference monitor to initiate an encrypted communication between the first client and the second client.

3. The method according to claim 1 wherein the policy table stores a plurality of entries wherein each entry corresponds with a particular policy state and session key.

4. The method according to claim 1 further compromising dynamically modifying the policy state within the policy table while retaining the certificate.

5. The method according to claim 1 wherein the permit identifier is represented by an index number.

6. The method according to claim 1 further comprising preventing the transmission and receiving of encrypted communications between the first client and the second client by indicating an invalid client enrollment status within an enrollment table in the reference monitor.

7. The method of claim 1 further comprising issuing a session key from the reference monitor to the first client and the second client based on the policy state such that the first and second client are capable of transmitting and receiving an encrypted communication.

8. The method according to claim 2 wherein the transaction is a cryptographic protocol for authentication and key agreement.

9. The method of claim 7 further comprising allowing a third client to intercept a certificate transmitted between the first and second clients, under proper authorization issuing the session key from the reference monitor to a third client such that the third client is capable of decrypting the encrypted communications between the first and second clients.

10. A system comprising:
a first client configured to communicate through a network and capable of issuing a first authenticated request encrypted by a first encryption key to a reference monitor; and
a second client configured to communicate through the network and capable of issuing a second authenticated request encrypted by a second encryption key requesting communication with the first client to the reference monitor;
wherein the reference monitor, upon verifying the first authenticated request utilizing the first encryption key and verifying the second authenticated request utilizing the second encryption key, is configured to generate a session certificate including an encrypted identifier wherein the encrypted identifier corresponds to a policy state and a third encryption key as a session key that is associated with a particular entry in a policy table that is stored within the reference monitor, wherein the encrypted identifier is utilized by the first and second clients, wherein the first client and the second client are provided with an encrypted communication channel through the network.

11. The system according to claim 10 wherein the network is an Internet.

12. The system according to claim 10 wherein the reference monitor is configured to utilize a cryptographic protocols for authentication and key agreement to provide the encrypted communication channel.

13. The system according to claim 10 wherein the reference monitor is configured to communicate with an application layer gateway.

14. The system according to claim 10 wherein the reference monitor is configured to communicate with a proxy server.

15. The system according to claim 10 wherein the reference monitor is configured to communicate with a user agent.

16. The system according to claim 10 wherein the policy table stores a plurality of entries each entry corresponds with a particular policy state and session key.

17. The system according to claim 10 wherein the policy state is modified through a change within the policy state table while retaining the certificate.

18. The system according to claim 10 wherein the reference monitor is configured to issue a session key to the first client and the second client based on the policy state such that the first and second client are capable of utilizing the encrypted communication channel.

19. The system according to claim 18 wherein the reference monitor is configured to issue the session key to a third client based on a proper authorization such that the third client is capable of decrypting the encrypted communication channel.

20. A method comprising:
receiving a first authenticated request encrypted by a first encryption key for communicating with a second client from a first client at a reference monitor;

creating an entry that contains a session key in a permit table that is stored within the reference monitor when the first authenticated request is adjudicated;

transmitting a first authenticated response with a first session certificate with a third encryption key and the session key from the reference monitor to the first client upon verifying the first encryption key, wherein the first session certificate includes an encrypted permit identifier;

transmitting the first session certificate from the first client to a second client;

transmitting a second authenticated request encrypted by a second encryption key for communicating with the first client along with the first session certificate from the second client to the reference monitor;

upon verifying the second authenticated request utilizing the second encryption key, decrypting the encrypted permit identifier at the reference monitor based on the first certificate transmitted from the second client to the reference monitor;

retrieving the session key at the reference monitor upon the second authenticated request is adjudicated, wherein the session key allows the first client to encrypt messages to the second client and the session key allows the second client to decrypt encrypted messages from the first client;

transmitting a second authenticated response with the session key including the third encryption key from the reference monitor to the second client;

decrypting the encrypted data sent from the first client to the second client in response to the third encryption key.

* * * * *